(12) United States Patent
Farmer et al.

(10) Patent No.: US 11,954,715 B2
(45) Date of Patent: *Apr. 9, 2024

(54) METHODS AND SYSTEMS FOR ACCESSING INFORMATION RELATED TO AN ORDER OF A COMMODITY

(71) Applicant: TRACE PRODUCE, LLC, Nyssa, OR (US)

(72) Inventors: James G. Farmer, Nyssa, OR (US); Charles W. Farmer, Nyssa, OR (US); Joseph W. Farmer, Nyssa, OR (US)

(73) Assignee: TRACE PRODUCE, LLC, Nyssa, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/488,097

(22) Filed: Sep. 28, 2021

(65) Prior Publication Data

US 2022/0020073 A1 Jan. 20, 2022

Related U.S. Application Data

(60) Continuation of application No. 16/502,884, filed on Jul. 3, 2019, now Pat. No. 11,132,726, which is a (Continued)

(51) Int. Cl.
*G06Q 30/06* (2023.01)
*G06Q 10/06* (2023.01)
(Continued)

(52) U.S. Cl.
CPC ......... *G06Q 30/0609* (2013.01); *G06Q 10/06* (2013.01); *G06Q 20/203* (2013.01); (Continued)

(58) Field of Classification Search
None
See application file for complete search history.

(56) References Cited

U.S. PATENT DOCUMENTS 5,478,990 A 12/1995 Montanari et al.
5,503,859 A 4/1996 Creason et al.
(Continued)

FOREIGN PATENT DOCUMENTS

CA 2609709 A1 * 2/2007 .......... G06Q 10/087
CA 2609709 A1 2/2007
(Continued)

OTHER PUBLICATIONS

International Search Report dated Nov. 20, 2009, for International Application No. PCT/US2009/039533.
(Continued)

*Primary Examiner* — Nicholas D Rosen
(74) *Attorney, Agent, or Firm* — Dorsey & Whitney LLP

(57) ABSTRACT

Methods of allowing a customer to access information related to an order of a commodity include gathering inspection information from a commodity lot, collecting grower, field, and packing information associated with the commodity lot, recording purchase orders associated with the commodity lot, assigning a trace code to each of the purchase orders, entering the inspection information; the grower, field, and packing information; the purchase orders; and the trace codes into a database maintained through online accounts. Many members of a supply chain are entitled to accounts that are linked, each account being given limited access to other accounts, thereby allowing the customer to access the inspection information, and the grower, field, and packing information, by entering one of the trace codes into the web-based application. According to one exemplary embodiment, each of the purchase orders associated with the commodity lot is linked within the web-based application.

69 Claims, 21 Drawing Sheets

Related U.S. Application Data division of application No. 16/121,461, filed on Sep. 4, 2018, now Pat. No. 10,922,729, which is a continuation of application No. 14/154,354, filed on Jan. 14, 2014, now Pat. No. 10,096,047, which is a division of application No. 12/061,868, filed on Apr. 3, 2008, now Pat. No. 10,229,441, which is a continuation-in-part of application No. 11/636,128, filed on Dec. 8, 2006, now Pat. No. 7,996,285, which is a continuation-in-part of application No. 11/363,785, filed on Feb. 27, 2006, now Pat. No. 8,131,599.

(51) Int. Cl.
| | | |
|---|---|---|
| *G06Q 20/20* | (2012.01) | |
| *G06Q 30/02* | (2023.01) | |
| *G06Q 30/0251* | (2023.01) | |
| *G06Q 30/0601* | (2023.01) | |
| G06F 16/955 | (2019.01) | |
| G06Q 10/063 | (2023.01) | |
| G06Q 10/087 | (2023.01) | |
| G06Q 99/00 | (2006.01) | |

(52) U.S. Cl.
CPC ..... *G06Q 30/0251* (2013.01); *G06Q 30/0261* (2013.01); *G06Q 30/06* (2013.01); *G06Q 30/0601* (2013.01); G06F 16/9554 (2019.01); G06Q 10/063 (2013.01); G06Q 10/087 (2013.01); G06Q 99/00 (2013.01)

(56) References Cited

U.S. PATENT DOCUMENTS

| | | |
|---|---|---|
| 5,913,210 A | 6/1999 | Call |
| 6,220,509 B1 | 4/2001 | Byford |
| 6,545,604 B1 | 4/2003 | Dando et al. |
| 6,671,696 B1 | 12/2003 | Holcombe et al. |
| 6,854,656 B2 | 2/2005 | Matsumori |
| 6,912,441 B2 | 6/2005 | Booth et al. |
| 6,934,028 B2 * | 8/2005 | Ho ............... G01N 21/89 382/141 |
| 6,963,881 B2 | 11/2005 | Pickett et al. |
| 7,136,869 B2 | 11/2006 | Holcombe et al. |
| 7,183,923 B2 | 2/2007 | Sasaki et al. |
| 7,236,947 B2 | 6/2007 | Eckert et al. |
| 7,260,564 B1 | 8/2007 | Lynn et al. |
| 7,464,091 B2 | 12/2008 | Conrad et al. |
| 7,571,166 B1 * | 8/2009 | Davies ............... G06Q 10/087 |
| 7,590,555 B2 * | 9/2009 | Brown ............... G06Q 10/0875 705/22 |
| 7,614,546 B2 | 11/2009 | Grant et al. |
| 7,681,527 B2 | 3/2010 | Pratt |
| 7,689,465 B1 | 3/2010 | Shakes et al. |
| 7,761,382 B2 | 7/2010 | Becker et al. |
| 7,949,668 B2 | 5/2011 | Holcombe et al. |
| 7,996,285 B2 | 8/2011 | Farmer et al. |
| 8,019,633 B2 | 9/2011 | Stroman et al. |
| 8,019,662 B2 | 9/2011 | Lucas |
| 8,131,599 B2 | 3/2012 | Farmer et al. |
| 8,155,313 B2 | 4/2012 | Grant |
| 8,245,927 B2 | 8/2012 | Grant et al. |
| 8,300,806 B2 | 10/2012 | Grant |
| 8,306,871 B2 | 11/2012 | Farmer et al. |
| 8,307,000 B2 | 11/2012 | Holcombe et al. |
| 8,364,558 B2 | 1/2013 | Farmer et al. |
| 8,407,103 B2 | 3/2013 | Farmer et al. |
| 8,447,630 B2 | 5/2013 | Obrien et al. |
| 8,489,437 B1 | 7/2013 | Dlott et al. |
| 8,500,015 B2 | 8/2013 | Grant et al. |
| 8,645,422 B2 | 2/2014 | Pool |
| 8,649,512 B2 | 2/2014 | Grant |
| 9,690,765 B2 | 6/2017 | Holcombe et al. |
| 10,096,045 B2 | 10/2018 | Bash et al. |
| 10,096,047 B2 | 10/2018 | Farmer et al. |
| 10,229,441 B2 | 3/2019 | Farmer et al. |
| 10,409,902 B2 | 9/2019 | Holcombe et al. |
| 10,922,729 B2 * | 2/2021 | Farmer ............... G06Q 30/06 |
| 11,126,790 B2 | 9/2021 | Holcombe et al. |
| 11,132,726 B2 * | 9/2021 | Farmer ............... G06Q 10/06 |
| 2001/0001854 A1 | 5/2001 | Schena et al. |
| 2001/0011437 A1 | 8/2001 | Shortridge et al. |
| 2001/0020932 A1 | 9/2001 | Merminod et al. |
| 2001/0020935 A1 | 9/2001 | Gelbman |
| 2001/0027356 A1 | 10/2001 | Okamura |
| 2001/0030749 A1 | 10/2001 | Ho et al. |
| 2001/0032161 A1 | 10/2001 | Thomas et al. |
| 2001/0049634 A1 | 12/2001 | Stewart |
| 2003/0009254 A1 | 1/2003 | Carlson et al. |
| 2003/0018665 A1 | 1/2003 | Dovin et al. |
| 2003/0069772 A1 | 4/2003 | Roberts et al. |
| 2003/0135432 A1 | 7/2003 | McIntyre et al. |
| 2003/0191691 A1 | 10/2003 | Macleod |
| 2003/0220862 A1 | 11/2003 | Kilgore et al. |
| 2003/0236768 A1 | 12/2003 | Sribhibhadh et al. |
| 2004/0083201 A1 | 4/2004 | Sholl et al. |
| 2004/0122733 A1 | 6/2004 | Hanschen et al. |
| 2004/0128015 A1 | 7/2004 | Booth et al. |
| 2004/0177011 A1 | 9/2004 | Ramsay et al. |
| 2004/0193500 A1 | 9/2004 | Brown et al. |
| 2004/0222302 A1 | 11/2004 | Matsumori |
| 2004/0223606 A1 | 11/2004 | Enete et al. |
| 2004/0225752 A1 | 11/2004 | O'Neil et al. |
| 2004/0260495 A1 | 12/2004 | Hopple |
| 2005/0039136 A1 | 2/2005 | Othmer |
| 2005/0051109 A1 | 3/2005 | Fantin et al. |
| 2005/0075900 A1 | 4/2005 | Arguimbau |
| 2005/0086132 A1 | 4/2005 | Kanitz et al. |
| 2005/0149373 A1 | 7/2005 | Amling et al. |
| 2005/0149391 A1 * | 7/2005 | O'Shea ............... G06Q 30/0633 705/14.38 |
| 2005/0159974 A1 | 7/2005 | Moss et al. |
| 2005/0246752 A1 | 11/2005 | Liwerant et al. |
| 2005/0266494 A1 | 12/2005 | Hodge |
| 2006/0030706 A1 | 2/2006 | Vonwiller et al. |
| 2006/0051562 A1 | 3/2006 | Sakuma et al. |
| 2006/0080190 A1 | 4/2006 | Furukawa et al. |
| 2006/0100939 A1 | 5/2006 | Boyer et al. |
| 2006/0122921 A1 | 6/2006 | Comerford et al. |
| 2006/0129463 A1 | 6/2006 | Zicherman |
| 2006/0255948 A1 | 11/2006 | Runyon et al. |
| 2007/0022214 A1 | 1/2007 | Harcourt |
| 2007/0118739 A1 | 5/2007 | Togashi et al. |
| 2007/0129990 A1 | 6/2007 | Tzruya et al. |
| 2007/0156544 A1 | 7/2007 | Meyer et al. |
| 2007/0157105 A1 | 7/2007 | Owens et al. |
| 2007/0162350 A1 | 7/2007 | Friedman |
| 2007/0203724 A1 | 8/2007 | Farmer et al. |
| 2007/0203818 A1 | 8/2007 | Farmer et al. |
| 2007/0205258 A1 | 9/2007 | Self et al. |
| 2007/0215685 A1 | 9/2007 | Self et al. |
| 2008/0011841 A1 | 1/2008 | Self et al. |
| 2008/0021740 A1 | 1/2008 | Beane et al. |
| 2008/0041950 A1 | 2/2008 | Michels |
| 2008/0065473 A1 | 3/2008 | Stroman et al. |
| 2008/0262923 A1 | 10/2008 | Farmer et al. |
| 2008/0287373 A1 * | 11/2008 | Popp ............... A61K 9/0014 514/25 |
| 2008/0300984 A1 | 12/2008 | Li |
| 2009/0254460 A1 | 10/2009 | Farmer et al. |
| 2010/0031178 A1 | 2/2010 | Motobayashi et al. |
| 2010/0106660 A1 | 4/2010 | Farmer et al. |
| 2012/0298741 A1 | 11/2012 | Grant et al. |
| 2013/0332262 A1 | 12/2013 | Hunt et al. |
| 2014/0129383 A1 | 5/2014 | Farmer et al. |
| 2016/0140227 A1 | 5/2016 | Lymberopoulos et al. |
| 2018/0357594 A1 | 12/2018 | Rabibadhana |
| 2018/0374132 A1 | 12/2018 | Farmer et al. |
| 2020/0082448 A1 | 3/2020 | Farmer et al. |

(56) References Cited

U.S. PATENT DOCUMENTS

FOREIGN PATENT DOCUMENTS

| JP | 2002297625 A | 10/2002 |
| KR | 20040110912 A | 12/2004 |
| KR | 102001011091 | 12/2004 |
| MX | PA06004007 A | 10/2006 |
| WO | 2005002747 A1 | 1/2005 |
| WO | 2005022303 A2 | 3/2005 |

OTHER PUBLICATIONS

International Search Report dated Mar. 4, 2010 for International Application No. PCT/US2009/061095.
Ahlstrom, "Google Breaks New Ground with Free Phone Call Service", Irish Times, Aug. 25, 2005.
Anon, "John Deere Partners with Vantagepoint Network and Cropverifeye.com, Llc to Introduce the New Croptracer System", PR Newswire, Feb. 26, 2001.
Anon, "MOL Launches Web Track-and-Trace", Journal of Commerce, Mar. 30, 2004, p. 1.
Anon, "Safety Net: In Light of a Recent Spike in Discoveries of Foodborne Contamination, Preventing Such Events at All Points in the Food Supply Chain Has Become More Important Than Ever", Progressive Grocer, Apr. 15, 2004, p. 67.
Clemens, "Meat Traceability in Japan", Iowa Ag Review, Fall 2003, pp. 4-5.
Petrak, Lynn, Dairy Foods, "With a Trace: RFID, track-and-trace technology enable processors to make sure everything is in its place", obtained Feb. 8, 2024 from https://web.archive.org/web/20230127114547/https://www.dairyfoods.com/articles/87130-with-a-trace, published Jun. 1, 2006, 6 pages.
*Pardalis Technology Licensing, L.L.C. v. International Business Machines Corporation*, Civil Action No. 2:22-cv-452, Plaintiff's First Amended Complaint for Patent Infringement, filed Oct. 11, 2023 in the Eastern District of of Texas Marshall Division, 154 pages.

* cited by examiner

Bag Run Detail

| | | | |
|---|---|---|---|
| Run_date | 04/18/20 | Unit Type | 4X6 |
| Run_no | 04/18/01 | Total Bags | 0 |
| Grower | DSRT | Total Workers | 60 |
| Grower Name | Deseret Farms | Direct Workers | 50 |
| Lot ID | YGRAN-B04 | Total Hours | 5.50 |
| Number of Units | 290 | Man Hours | 330.00 |
| From Storage | 3RD7   3RD7 | | |

Total Cost per Bag  0.000   Direct Cost Per Bag  0.000

Re-Bin Info

| New Lot # | Color | Variety | New Storage | # of Bins | Date |
|---|---|---|---|---|---|
| | | | | | |

Next | Previous | Browse | Add | Edit | Delete | Print | Detail

OK | Exit

FIG. 4

| Inspection Details | | | | | | |
|---|---|---|---|---|---|---|
| Run no. 500902 | | CAIP RCJF | USDA | | Time 14:01:14 | |
| Color Yellow | Size JBO | Brand | Count 0 | | 3.5 and over | 0.00 |
| Size min 3.0 | Size max 4.5 | OffSizeMin 0.00 | | OffSizeMax 0.00 | | |

| | | | |
|---|---|---|---|
| Tops 0.00 | Peelers 0.00 | Sunburn 0.00 | Appr Staining 0.00 |
| Damage 0.00 | Decay 0.00 | Serious Damage 0.00 | Bad Staining 0.00 |

☐Cuts/Bruises ☐Misshapen ☐Seed Stems ☐Close Trim Necks ☐Dry Sunken Area ☐Mold

Other: ☐Sprouts ☐Sour Skin ☐Cracked Fleshy Scale
☐Watery Scale ☐Translucent Scale ☐Off Variety Abbreviations: G=Generally 90%+, V=Mostly 50-89%, M=Many 26-49%, S=Some, 11-25% F=Few 0-10%

| | | | | |
|---|---|---|---|---|
| Shaped Well G | Shaped Fairly Well F | Clean G | Fairly Clean F | Dirty |
| Bright F | Fairly Bright V | Dull S | Firm V | Fairly Firm S |

Maturity M   Out of Grade No   Dumped 0   Reran 0

Image   ☐Reinspection   Next   Done   Cancel

METHODS AND SYSTEMS FOR ACCESSING INFORMATION RELATED TO AN ORDER OF A COMMODITY

RELATED APPLICATIONS

This application is a Continuation of U.S. application Ser. No. 16/502,884, filed Jul. 3, 2019, which is Divisional of U.S. application Ser. No. 16/121,461, filed Sep. 4, 2018, now U.S. Pat. No. 10,922,729, which is a Continuation of U.S. application Ser. No. 14/154,354, filed Jan. 14, 2014, now U.S. Pat. No. 10,096,047, which is a Divisional of U.S. application Ser. No. 12/061,868, filed Apr. 3, 2008, which is a Continuation-In-Part of U.S. application Ser. No. 11/636,128, filed on Dec. 8, 2006, now U.S. Pat. No. 7,996,285, which is a Continuation-In-Part of U.S. application Ser. No. 11/363,785, filed Feb. 27, 2006, now U.S. Pat. No. 8,131,599, which are herein incorporated by reference in their entireties.

BACKGROUND

The ability to trace produce back to its packing facilities, inspection points, and even the field in which it was grown is becoming more of a necessity in the produce industry as concerns regarding food safety increase. In the event of a food-borne illness outbreak, for example, damage may be limited if the source of the contaminated product is identified quickly so that other products grown in the same field, processed in the same packing facility, and/or transported in the same vehicle can be quarantined.

The events of Sep. 11, 2001 reinforced the need to enhance the security of the United States. They also raised awareness of the possibility of bioterrorism attacks. Hence, Congress passed the Public Health Security and Bioterrorism Preparedness and Response Act of 2002 (the Bioterrorism Act), which requires food handlers to establish and maintain records for all food directly in contact with its finished container.

In addition, many customers, such as brokers and retailers, are increasingly requesting real time access to information regarding the produce they buy. For example, they often desire to view shipping, tracing, and inspection information immediately after they place an order for produce. Many customers also require independent certification audits of all produce sold in their stores.

Currently, much of the shipping, tracing, and inspection information are recorded on paper. Moreover, a myriad of different recording techniques are used to record this information. Consequently, it is often difficult to comply with government requirements to be able to quickly trace produce back to the packing facility in which it was processed and to the field in which it was grown. It is also difficult to comply with customers' requests to instantaneously access information regarding their produce orders.

SUMMARY

Methods of allowing a customer to access information related to an order of a commodity include gathering inspection information from a commodity lot, collecting grower, field, and packing information associated with the commodity lot, collecting pictures and videos related to the commodity lot, recording purchase orders associated with the commodity lot, assigning a trace code or electronic code to each of the purchase orders, entering the inspection information; the grower, field, and packing information; the relevant pictures and videos; the purchase orders; and the trace codes into a central database. Once entered into the central database, the content of a web-based application may be updated with the inspection information, the grower, field, and packing information, pictures and videos, the purchase orders, and the trace codes within the central database, thereby allowing the customer to access the inspection information, and the grower, field, and packing information, as well as related videos and pictures, by entering one of the trace codes into the web-based application. According to one exemplary embodiment, each of the purchase orders associated with the commodity lot is linked within the web-based application.

According to one example, systems for allowing a customer to access information related to an order of a commodity include a server configured to store the information in a central database, the information including inspection information corresponding to a single source lot of the order of the commodity including an inspection photograph of the source lot of the commodity and at least one or more of sales information, shipping information, pack out information, inventory information, and tracing information corresponding to the order of the commodity, as well as links to videos that may be relevant to the commodity. Additionally, one or more terminals having one or more applications configured to enter the information into the central database and a web-based application configured to allow the customer to access the information within the central database are included in the exemplary system. According to one exemplary embodiment, multiple orders from the single source lot are linked to facilitate access to all orders of the commodity originating from the single source lot.

According to another example, a system in which a central website links several databases populated and maintained by various members of the supply chain including packing facilities. According to this exemplary implementation, a packing facility or other member of the supply chain records and enters information into a database, including inspection information corresponding to a single source lot of the order of the commodity including an inspection photograph of the source lot of the commodity and at least one or more of sales information, shipping information, pack out information, inventory information, and tracing information corresponding to the order of the commodity, as well as links to videos that may be relevant to the commodity. The database may also contain information about the grower, field, and packing information associated with the commodity lot, pictures and videos related to the commodity lot, recording purchase orders associated with the commodity lot, audits, pesticide records, certificates, organic certificates, bills of lading, memorandums, and other pertinent information relative to the history of a commodity. Through a central website, a consumer or supplier is able to view the information related to a purchased commodity; the central website retrieves the necessary information from one or more databases maintained by members of the supply chain (e.g. The packing facility) to display information to the consumer.

According to an alternative embodiment, a central Web Server allows account access. According to this embodiment, a members of the supply chain would be able to create an account on the trace produce website. Similar to the embodiment described above, a central server or servers are populated with information from members of the supply chain, including but not limited to growers, packing facilities, shippers, customers, brokers, and re-packers; however, according to an embodiment incorporating accounts, a supply chain member creates an account and is allowed to view and enter information with limited access. Accounts would allow a limited access by one member of the supply chain to view information belonging to another member of the supply chain. For example, a shipper may have an account allowing him to send messages or negotiate with a customer; while the packing facility account may allow him to view information of the shipper, the packer may not have privileges to view information of the customer. This process will be described in greater detail below.

BRIEF DESCRIPTION OF THE DRAWINGS

The accompanying drawings illustrate various embodiments of the principles described herein and are a part of the specification. The illustrated embodiments are merely examples and do not limit the scope of the disclosure.

FIG. 4 is a screen shot of an exemplary software program that may be used by a packing facility worker to assign a tracking identification (ID) to an incoming lot of produce within a database according to principles described herein.

FIG. 5 is a screen shot of an exemplary produce inspection software program that may be used by an inspector to enter an inspection report into a database according to principles described herein.

Throughout the drawings, identical reference numbers designate similar, but not necessarily identical, elements.

DETAILED DESCRIPTION

Methods and systems for allowing a customer, a supplier, or a regulatory agency to access information related to an order of a commodity are described herein. The information may include sales information, shipping information, tracing information, related photos and videos, advertisement links, and/or inspection information corresponding to the order of the commodity, and in some instances messages from one member of the supply chain to another. In some examples, as will be described in more detail below, the information is entered into a central database via one or more applications residing on one or more terminals. A web-based application is regularly updated with the information within the central database. An authorized customer, supplier, regulatory agency, or other entity may then login to the web-based application and access the desired information related to the order of the commodity.

As used herein and in the appended claims, unless otherwise specifically denoted, the term "customer or consumer" will be used to refer to any authorized entity that logs into the web-based application and accesses information related to an order of commodity. Exemplary, but not exclusive, customers include, packing facilities, brokers, retailers, individual buyers, inspectors, shippers, growers, regulatory agencies, and others involved in the supply chain of the commodity.

It will be recognized that the systems and methods described herein may be applied to any type of commodity and are not limited to produce only. For example, the systems and methods described herein may be used to keep track of and access information regarding the production, processing, inspection, and/or shipment of any type of produce (e.g., fruits and vegetables), grain, meat, livestock, or other food product; it may be extended to include other fabricated products, where rather than including grower information it may include information pertaining to the fabrication of a certain product. However, for illustrative purposes only, produce will be used in the examples described herein.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
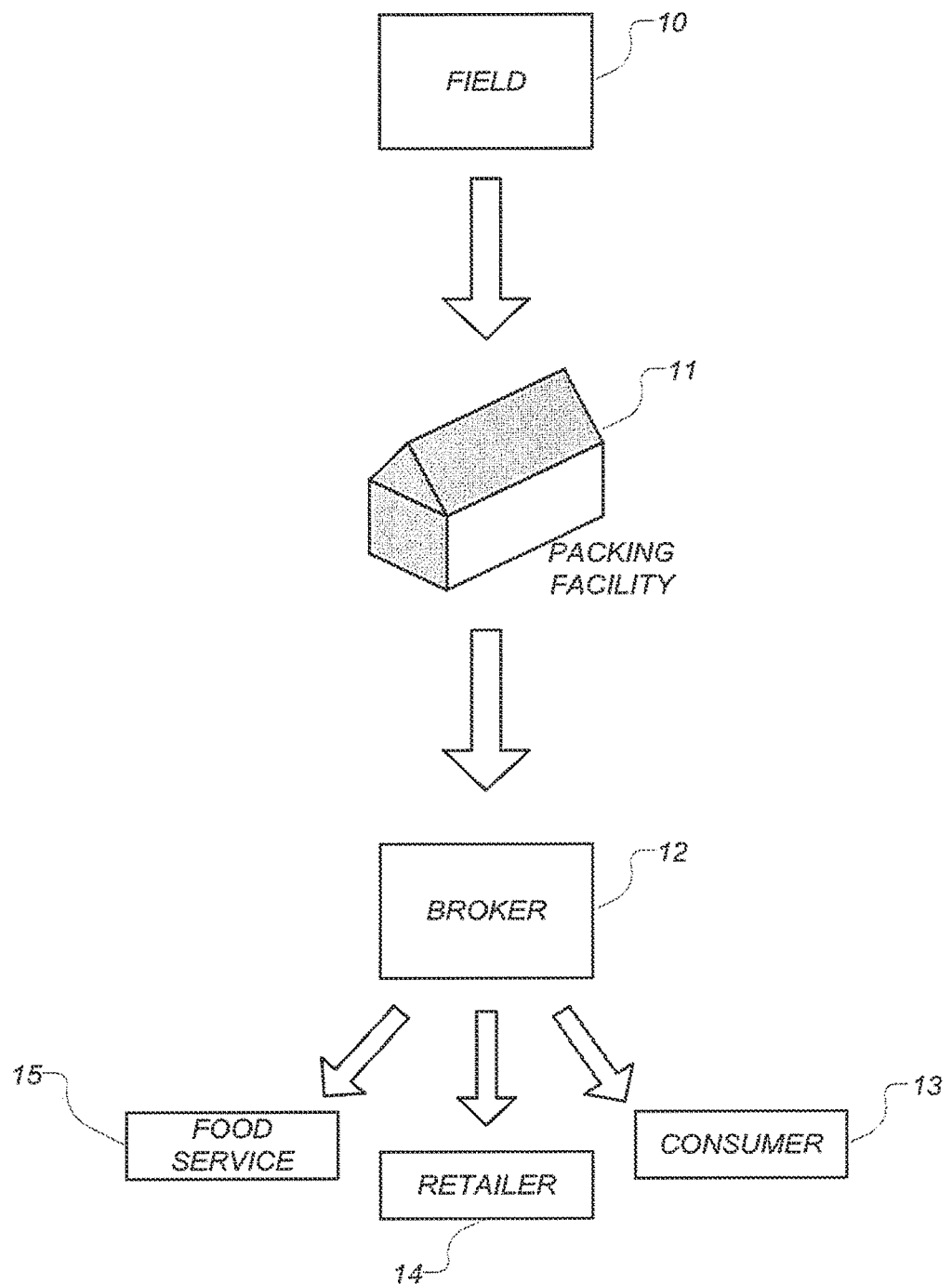
FIG. 1 illustrates an exemplary supply chain or path that produce may take in route to an end consumer according to principles described herein.

FIG. 1 illustrates an exemplary supply chain or path that produce may take in route to an end consumer. As shown in FIG. 1, the produce is first grown in a field (10) or in any other suitable environment. The produce is then harvested and taken to a packing facility (11) where it is processed and packed for shipment to various destinations. The packing facility (11) is also known as a packing shed or a packing house. In some alternative examples, harvested produce is first taken to a storage facility where it is stored for a period of time prior to being taken to the packing facility (11).

Packing facility operations may vary depending on the particular produce being processed. For example, packing facility operations may be as simple as moving produce from a field lug into a shipping container. Alternatively, packing facility operations may include a variety of handling practices including, but not limited to, cleaning, waxing, sizing, quality grading, color sorting, and inspecting.

Produce is often inspected at the packing facility (11) by a United States Department of Agriculture (USDA) inspector. Alternatively, many packing facilities (11) now participate in the USDA's Customer Assisted Inspection Program (CAIP). Under CAIP, a packing facility (11) hires its own internal inspector that has been certified by the state to inspect produce. The inspector's work is reviewed periodically by a USDA certified state inspector to ensure that inspection procedures are properly followed. The inspection procedure and other packing facility operations will be described in more detail below.

Once the produce has been processed in the packing facility (11) and packed, it is transported to various buyers. Produce is often bought by a broker (12), which, in turn, distributes the produce to various end consumers (13), retailers (14), or other food service entities (15). In some alternative arrangements, the packing facility (11) serves as a broker and distributes the produce directly to the customers.

As mentioned, produce buyers often desire access to information concerning the production, processing, inspection, and transportation of the produce that they purchase. This information includes, but is not limited to, load quantities, pricing, tracing information (i.e., information describing the grower of the produce and the particular field where the produce was grown), inspection report summaries, transport vehicle information, and images of the produce while still in the processing stage.

Figure 2:
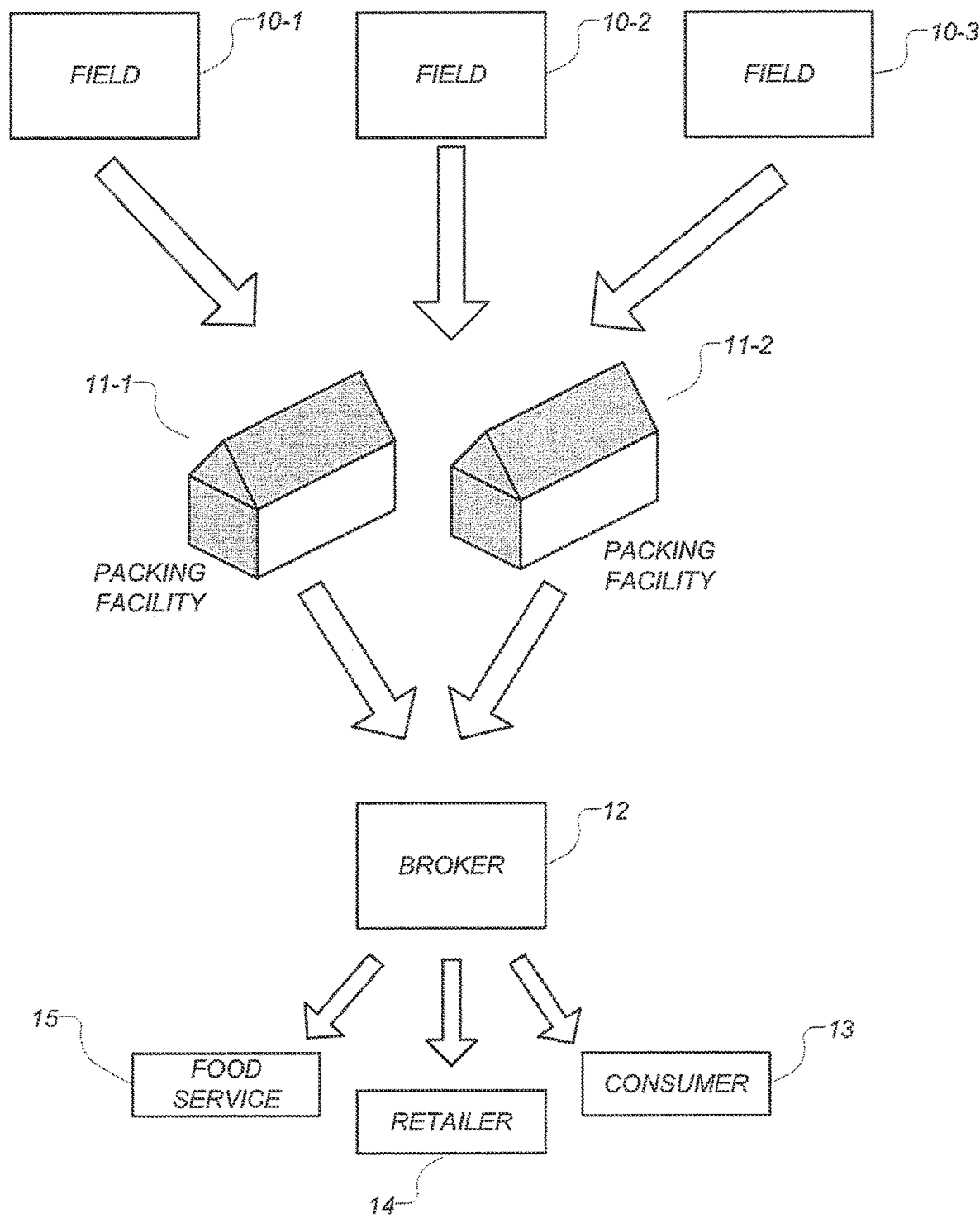
FIG. 2 illustrates multiple exemplary supply chains that produce may take in route to an end consumer according to principles described herein.

However, as shown in FIG. 2, a particular piece of produce that is sold to a broker (12) or a retailer (14), for example, may originate in one of many different fields (e.g., 10-1 through 10-3), be processed in one of many different packing facilities (e.g., 11-1, 11-2), and take one of many different transportation routes before it arrives at its final destination. Moreover, each packing facility (11) may use different recording, tracking, and inspection procedures. For these reasons, accessing desired information corresponding to produce once it is processed and shipped is often a difficult and lengthy process.

Hence, the systems and methods described herein may be used to standardize the recording procedures used by growers, packing facilities, inspectors, and shippers so that buyers may have real-time access to information related to the production, processing, inspection, and transportation of the produce that they purchase. As will be described in more detail below, a web-based application may be used to trace produce and to give produce buyers real-time access to information related to their purchase order.

Figure 3:
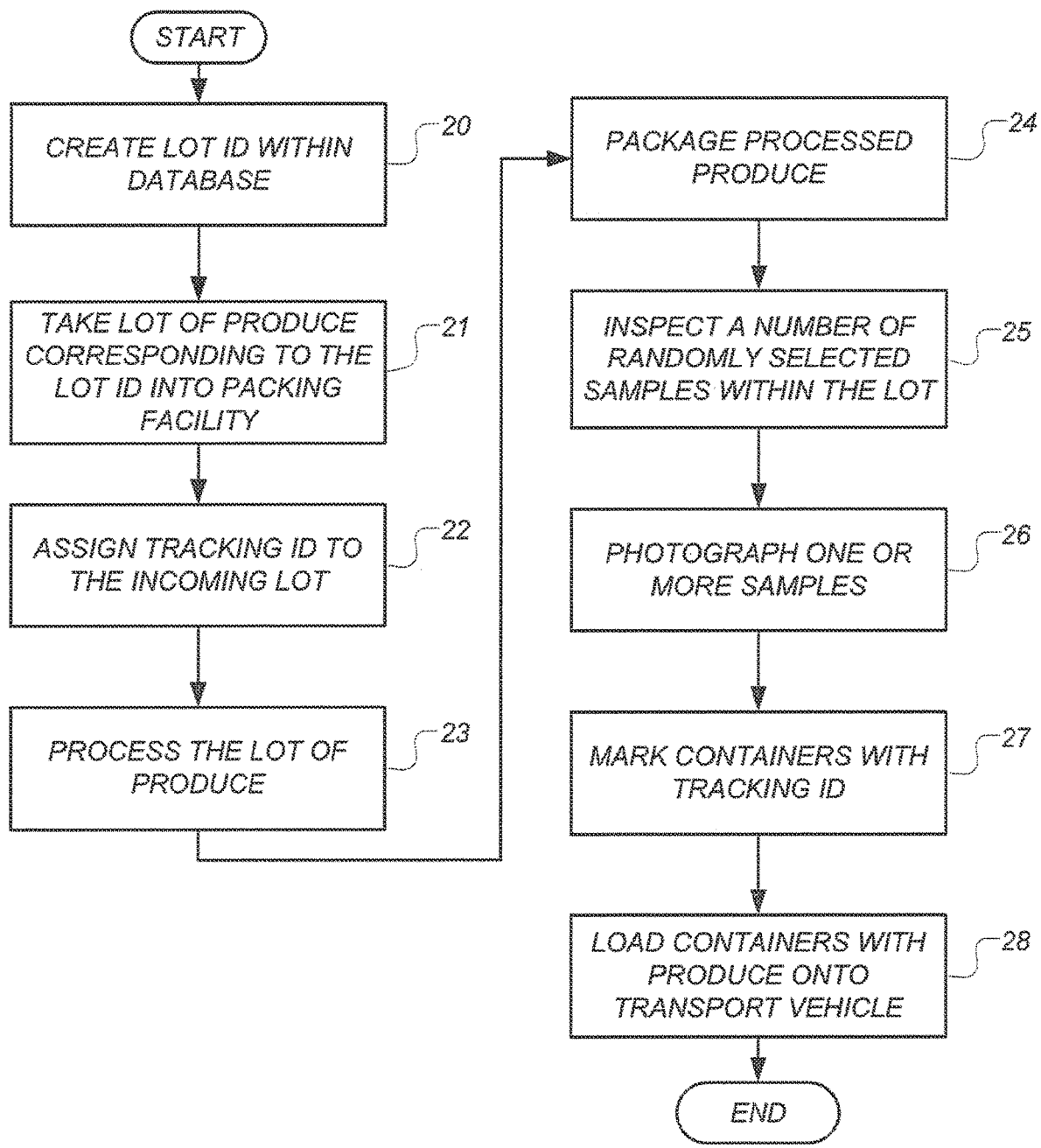
FIG. 3 is a flow chart illustrating an exemplary packing process that may be used within a packing facility to facilitate real-time access to processing, shipping, tracing, and inspection information corresponding to a lot of produce that is processed within the packing facility according to principles described herein.

FIG. 3 is a flow chart illustrating an exemplary packing process that may be used within a packing facility to facilitate real-time access to processing, shipping, tracing, and inspection information corresponding to a lot of produce that is processed within the packing facility. It will be recognized that the steps shown in FIG. 3 are merely exemplary and that they may be modified, reordered, added to, and/or removed as best serves a particular application. As shown in FIG. 3, a "lot identification" (lot ID) corresponding to a particular lot of produce to be processed in the packing facility is created within a database (step 20). As will be described further the database may be a central database or a local database. As used herein and in the appended claims, unless otherwise specifically denoted, the term "lot" will be used to refer to a particular batch or quantity of produce of the same kind that is taken to the packing facility to be processed. The lot ID may include any number of characters as best serves a particular application.

The database used in connection with the process of FIG. 3 may be created within any database application as best serves a particular application. Exemplary database applications that may be used include, but are not limited to, FoxPro™, Structured Query Language (SQL), and Microsoft™ Access™.

In some examples, the lot ID is linked within the database to one or more lot attributes. For example, the lot ID may be linked to photographs, videos, or other multimedia presentations of the grower of the produce, the field where the lot of produce is grown, and the packing facility where the lot of produce is processed. According to one exemplary embodiment the lot ID has links to videos on a video hosting website such as youtube. Text describing the grower, field, packing facility, and/or third party audits of the produce may be additionally or alternatively linked to the lot ID. The text may include, but is not limited to; the name of the grower, global positioning satellite (GPS) coordinates of the field, seed variety information, a description of the packing facility, and/or any other applicable information. According to one exemplary embodiments, the lot ID may also be linked directly or indirectly to various advertisements. A lot ID may also have audits, pesticide records, certificates, organic certificates, bills of lading, and memorandums associated and linked to a lot ID. Some of these materials, such as audits and certifications may be accessible through third party websites. A link may be provided on the traceproduce website allowing a consumer to click the link and be directed to an audit or certification agency's website containing information on audits or certification documentation regarding the lot ID. As previously described, the system and method may be extended to include a wide variety of products, not exclusively produce; therefore it is possible that the system and method will incorporate a different set of informational items associated with a given product, all of which may be linked to the lot ID.

Additionally, according to one exemplary embodiment, the text may be linked to a third party information website. For example, the text may include a link to a third party mapping service such as GOOGLE MAP, YAHOO MAPS, or MAPQUEST that provides a geographical map identifying the location of the field. According to this exemplary embodiment, the lot ID is linked to coordinates of the field location. When the link to the third party mapping service is selected, the coordinates are automatically entered into the query page of the third party mapping service, providing the desired map/photos. Alternatively, rather than be redirected through links to external web pages containing information such as maps, photos, videos, advertisements, and other multimedia presentations, the information may be displayed through third party snippets on the same page. For example, the YouTube videos or Google Maps may be displayed on the webpage rather than redirecting a consumer to a third party website.

As mentioned, text or multimedia presentations describing third party audits of the produce may additionally or alternatively be linked to the lot ID. Third party audits allow end customers to verify that the grower or shipper is using "good agricultural practices" and "good handling practices." The audits may be performed by any third party, e.g., Primus Labs. Certificates and audits may also be included verifying organically grown produce. Audits performed by any entity may be available to consumers in any format such as documentation, videos showing the audit being preformed, videos of a summary of an audit, and other pertinent information communicated in any form by members of the supply chain. It is also possible that some of these audits and certifications may be accessible through third party websites. A link may be provided on the traceproduce website allowing a consumer to click the link and be directed to an audit or certification agency's website containing information on audits or certification documentation regarding the lot ID.

As shown in FIG. 3, the lot of produce corresponding to the lot ID is then taken into the packing facility to be processed (step 21). A tracking ID may then be assigned to the incoming lot within the database (step 22). As will be described in more detail below, the tracking ID may be used anywhere in the supply chain to trace the lot of produce back to the packing facility and to the field in which the lot of produce was grown.

In some examples, the tracking ID is referred to as a run number and includes the date and order in which the lot is processed in the packing facility. For example, if the lot is the first lot to be processed in the packing facility on April 18 of a given year, it may be assigned a tracking ID of 04/18/01.

In some examples, the tracking ID may additionally or alternatively include a USDA positive lot identification (PLI) number. USDA PLI numbers are issued by the USDA to inspected lots of produce and are used to trace produce that is in commerce back to its packing facility. In some examples, the USDA PLI number is linked to the lot ID within the central database so that it may also be used to trace the produce back to the field in which it was grown.

In some alternative examples, both a run number and a USDA PLI number are assigned to an incoming lot of produce. A separate run number is advantageous in some instances because it may be easier for workers in the packing facility to work with run numbers rather than USDA PLI numbers. However, it will be recognized that run numbers and USDA PLI numbers are merely illustrative of the many different types of tracking numbers that may be assigned to an incoming lot of produce.

FIG. 4 is a screen shot of an exemplary software program that may be used by a packing facility worker to assign a tracking ID to an incoming lot of produce within the central database. As shown in FIG. 4, the packing facility worker may be presented with a number of additional input fields for each lot of produce processed. For example, the worker may additionally enter the date, lot ID, and/or various details regarding the particular lot of produce being processed.

Returning to FIG. 3, the lot of produce is then processed (step 23). As mentioned, the produce may be processed in a variety of different manners. For example, the produce may be cleaned, waxed, sized, quality graded, and/or sorted.

After the produce has been processed, it is packaged into containers (step 24). Once packaged, random samples of the produce within the lot are inspected by an inspector (step 25). As mentioned, the inspector may be an internal inspector hired by the packing facility. Alternatively, the inspector may be a government inspector assigned to the packing facility. A number of different qualities of the produce may be inspected depending on the particular type of produce being processed. For example, the inspector may ensure that the produce has been properly sorted and labeled by weight, color, quality, and/or grade.

In some examples, the inspector enters an inspection report into a software program that is linked to the central database. In this manner, the inspection report may be linked to a particular tracking ID within the database. For example, FIG. 5 is a screen shot of an exemplary produce inspection software program that may be used by an inspector to enter an inspection report into the central database. As shown in FIG. 5, the program allows the inspector to enter the tracking ID of the inspected samples; information identifying the inspector; and information corresponding to the brand, weight, color, quality, and/or grade of the produce. In some examples, the software program automatically date and time stamps the entry made by the inspector.

Returning to FIG. 3, a digital photograph of one or more samples within the lot of produce may also be taken (step 26). In some examples, the first sample within the lot of produce that is processed is photographed. Additionally or alternatively, one or more of the samples that are inspected are photographed. The photographs may then be stored and linked within the central database to the tracking ID.

Figure 6:
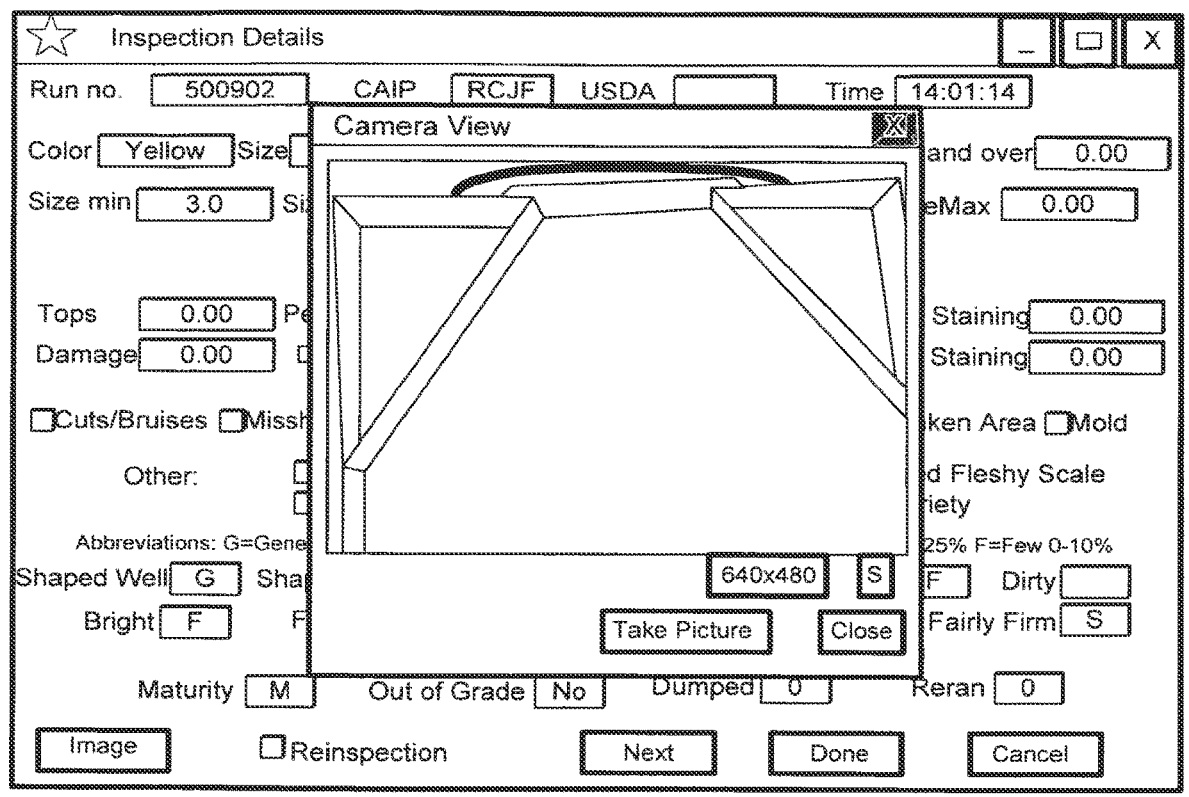
FIG. 6 is a screen shot illustrating an exemplary program that may be used to take digital photographs of the produce according to principles described herein.

In some examples, the camera that is used to take the digital photographs of the produce is controllable via a computer software interface. For example, as shown in FIG. 5, the software program used to inspect the produce may also include a button (50) that may be selected to activate a program that is used to take the digital photographs. FIG. 6 is a screen shot illustrating an exemplary program that may be used to take digital photographs of the produce.

In some examples, digital video of one or more samples within the lot of produce may additionally or alternatively be taken and linked to the tracking ID. For example, digital video may record some or all of the processing of a particular sample of produce in the packing facility.

Returning to FIG. 3, the containers are then marked with the tracking ID and/or other desirable information (e.g., lot and quantity information) (step 27). In some examples, the marking includes a bar code, radio frequency ID, or any other tagging system identifier.

In some examples, the marking information is printed on a tag that is affixed to each container. Additionally or alternatively, the marking information may be stamped or otherwise printed directly on each container.

In some examples, the marking information is affixed directly to each piece of produce within an order (e.g., a sticker is affixed to each piece of fruit within an order). However, it will be recognized that in some instances, it is too labor intensive to mark each individual piece of produce or even each individual container within an order. Hence, the marking information may alternatively be affixed to one or more pallets of containers in a particular order.

As it is possible that a packing facility may pack several products originating from different sources, wherein the products are of such a nature that individually labeling each own is unrealistic, the package may be labeled with several lot ID numbers. Each lot ID number on the package corresponding to one of the products within the package. One of example of this may include a packing facility that packages potatoes, the potatoes may originate from several different fields and growers. Each of the lots of produce received from the various growers is associated with a different lot ID, as they each originated from a different field and grower. A package created by the packing facility may contain potatoes of various origins; therefore, the outside of the package may contain the lot IDs of all of the potatoes possibly included in the package. A consumer may then use the several lot IDs on the package and trace back the history and other information as is described herein as being associated with a lot ID.

Alternatively, it may be desired to package the products from varying origins and label them with a single lot ID. This new lot ID would include the history of all of the products contained within the package. An example of how this may be used in practice is that of a salad. A salad comprising lettuce, spinach, carrots, radishes, and celery has five products that are each grown in a different field by a different grower, each associated to a different lot ID number. When the packing facility receives the five products and begins to package them as a salad together in one package, the packing facility may assign a new lot ID to the packaged salad. A consumer entering the lot ID found on the packaged salad will be directed to a web page showing the information of all of the products found within the package of salad. They will see that the map for the radishes, it's corresponding field, grower, videos and other information as described herein, they will then be able to, on the same page or through linked pages, see the same corresponding information for the fresh spinach's information, the lettuce's information, etc.

As apparent, this may be extended to any other package incorporating multiple products to be packaged in a single package, or to a single product originating from various locations, such as a package of apples coming from many different growers.

The containers of produce may then be loaded onto a transport vehicle (e.g., a truck, ship, airplane, etc.) (Step 28) and transported to one or more buyers who have placed orders for various quantities of produce. Each order is assigned a purchase order (PO) number within a database.

In some examples, the tagging system identifier (e.g., the bar code) corresponding to the containers in a particular purchase order is scanned into a database as the containers are loaded onto the transport vehicle to fulfill the purchase order. In this manner, the purchase order number may be linked to the tracking ID within the database. Additional information, such as the quantity of produce included within the shipment, may also be linked to the tracking ID within the database.

After a Bill of Lading is completed with the operator of the transport vehicle, the order may then be finalized by a shipping clerk entering the information in a database. In this manner, as will be described in more detail below, a customer may see via the Internet that his or her order has shipped almost as soon as the produce is loaded onto the transport vehicle. The Bill of Lading may be associated with a lot ID and be viewable on the web page.

It is possible that during the supply chain as shown in FIG. 1 or FIG. 2, additional groups may play a role. One example is that a repacker may be involved. A repacker may buy product and subsequently repack the product for resale. The ID process may be modified to accommodate for this by allowing additional members of the supply chain, e.g. repackers, to add to the PLI number or lot ID numbers to account for all steps taken during the supply chain from the field to the end consumer. This provides that when a trace back is performed on a lot ID all the information related to the supply chain is accounted for, including the possible repacking the commodity.

In one possible embodiment, food services, retailers, and other end consumers may further track the distribution of a given commodity such as produce. This may be done through the Trace Produce website or another website. This would allow a commodity distributor such as Wal-mart or US Foodservices to utilize the existing code found on products that come from the shipper, and enter the codes into an alternative tracing data system, or the traceproduce system, and track which stores or customer's the products went to.

Figure 7:
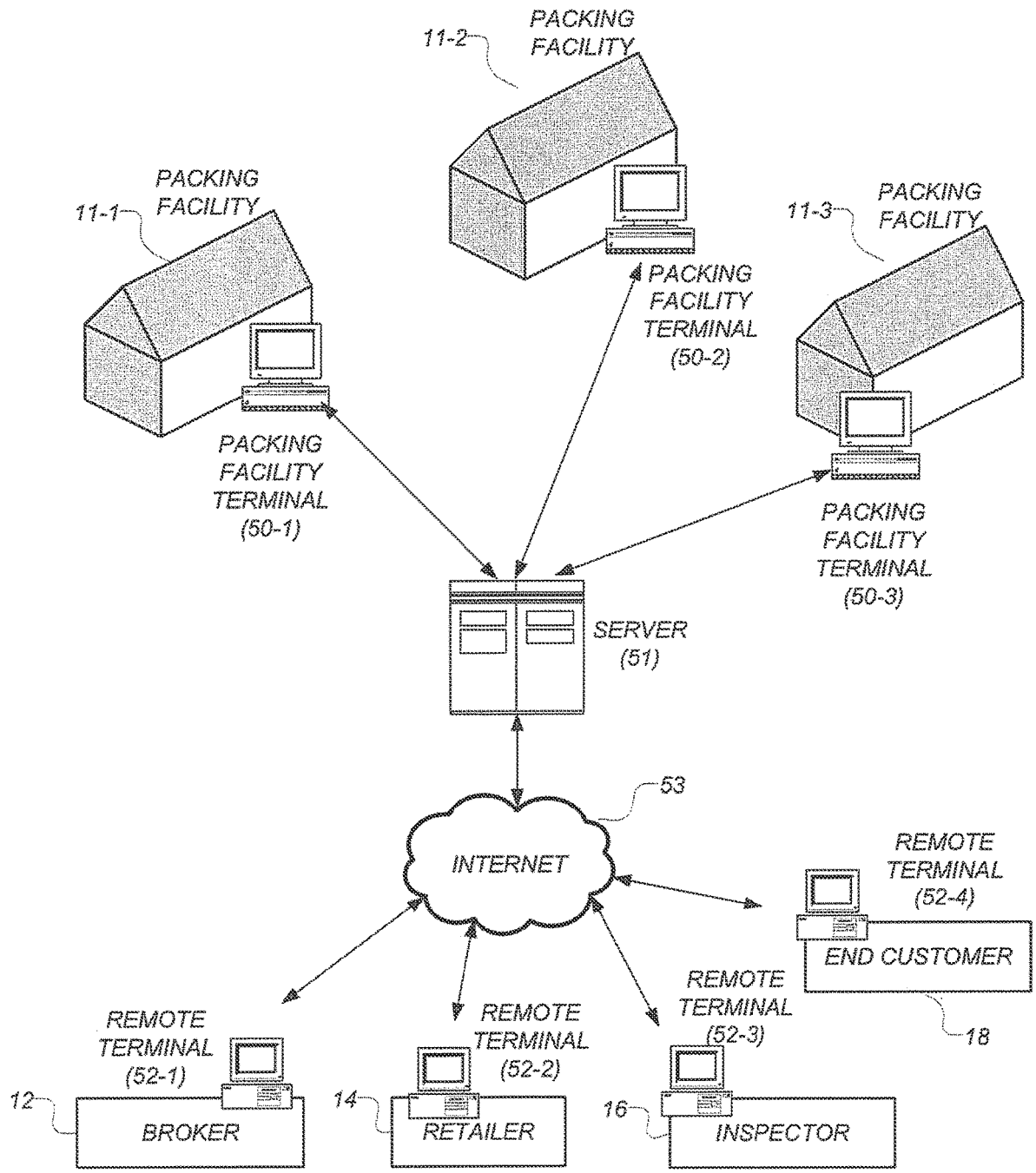
FIG. 7 illustrates an exemplary system in which a central server stores the databases of packing facilities, whereby a customer may access information regarding a pending or already placed produce order via the Internet or any other type of networking configuration according to principles described herein.

FIG. 7 illustrates an exemplary system whereby a customer may access information regarding a pending or already placed produce order via the Internet or any other type of networking configuration. The information may include, but is not limited to, sales, shipping, tracing, inspection, photos, videos, advertisements, and other load information. As shown in FIG. 7, a packing facility terminal (50-1 through 50-3) may be located at a number of different packing facilities (11-1 through 11-3). Information regarding the production, processing, and inspection of an order of produce at each packing facility (11) is entered into the central database, or server, (51) using the packing facility terminals (50) as described above in connection with FIGS. 3-6. This information is stored on a central server (51) which may also be located at any suitable location. The server (51) is connected to the Internet (53) or any other suitable network.

As shown in FIG. 7, any authorized customer or other entity that is also connected to the Internet (53) may access the information stored on the server (51). For example, a broker (12) may access the information stored on the server (51) using remote terminal (52-1), a retailer (14) may access the contents of the server (51) using remote terminal (52-2), an inspector (16) may access the contents of the server (51) using remote terminal (52-3), and/or an end customer (18) may access the contents of the server (51) using remote terminal (52-4).

Figure 8:
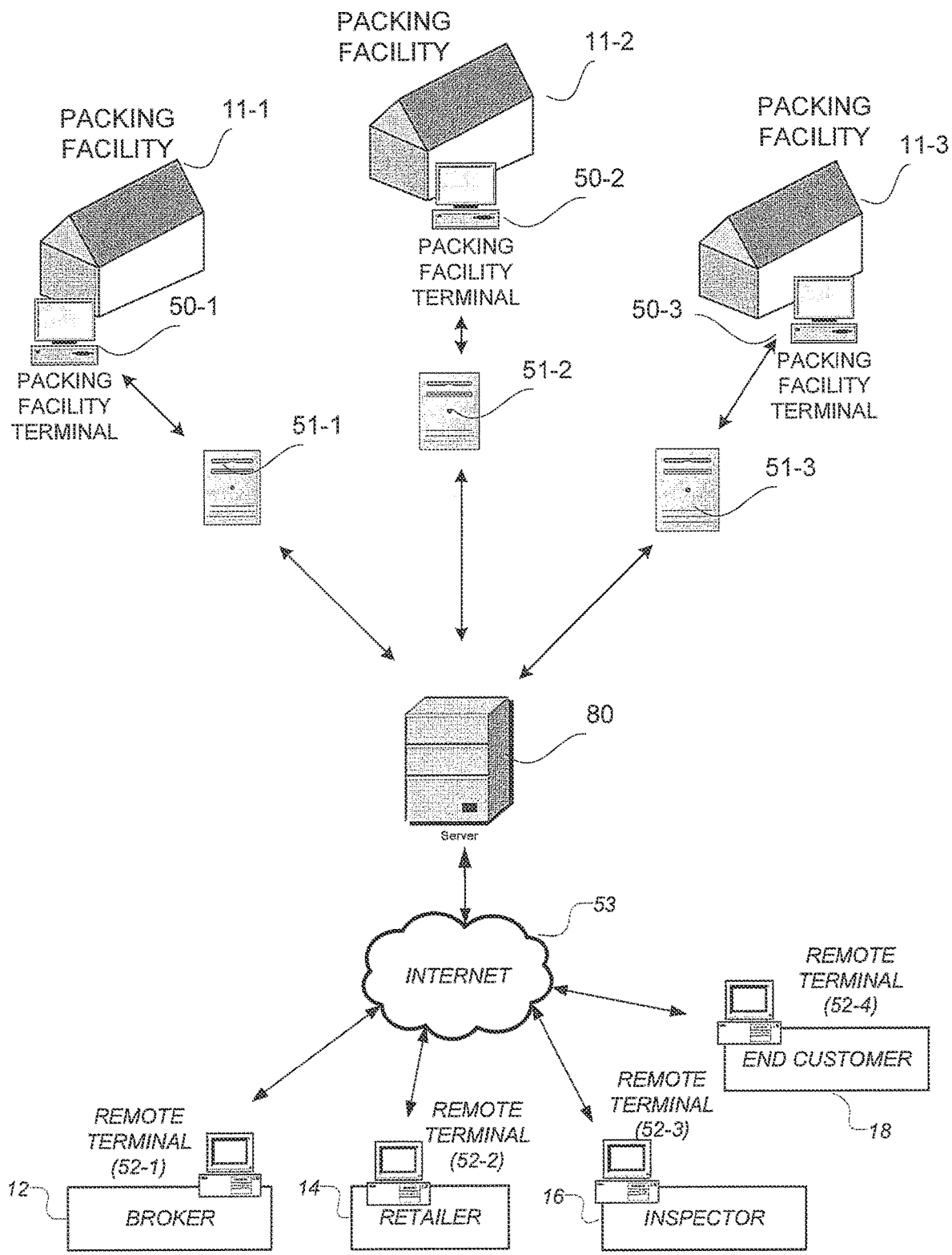
FIG. 8 illustrates an alternative exemplary system in which a web server accesses the various databases of packing facilities, whereby a customer may access information regarding a pending or already placed produce order via the Internet or any other type of networking configuration according to principles described herein.

As shown in FIG. 8, it will be recognized that the information entered at each packing facility (11) may alternatively be stored in separate databases (51-1 through 51-3) residing at the packing facilities (11). Information stored in these separate databases may be accessed by a server (80) querying each separate database instead of querying a central database. In some alternative examples, the information may be stored on separate databases (51-1 through 51-3) residing at the packing facilities (11) and in a central database as shown in FIG. 7. In this manner, desired information may be accessed by querying the packing facility databases (51-1 through 51-3) directly or by querying the central database (51, FIG. 7).

Each of the terminals (50, 52) shown in FIG. 7 may include any suitable computing device configured to be connected to the Internet (53). For example, the terminals (50, 52) may include, but are not limited to, personal computers, personal digital assistants (PDAs), and cellular phones. In some alternative examples, a customer without a connection to the Internet (53) may access information regarding a produce order by using an automated telephone system.

As mentioned, an authorized customer may access the information stored on the server (51) via a web-based application. In some examples, the contents of the web-based application are continuously updated with the contents of the database so that the information seen on the web-based application is always current. In some alternative applications, the contents of the web-based application are updated periodically as best serves a particular application.

In some examples, the web-based application is maintained by a produce facility, broker, or other entity. The customer may be given a username and password and may then login and view information specific to his or her produce order. An exemplary web-based application configured to provide information regarding a produce order will now be described. It will be recognized that the web-based application described herein is merely illustrative of the many different web-based applications that may be used to provide access to information regarding a produce order to a customer or to any other authorized entity.

Figure 9A:
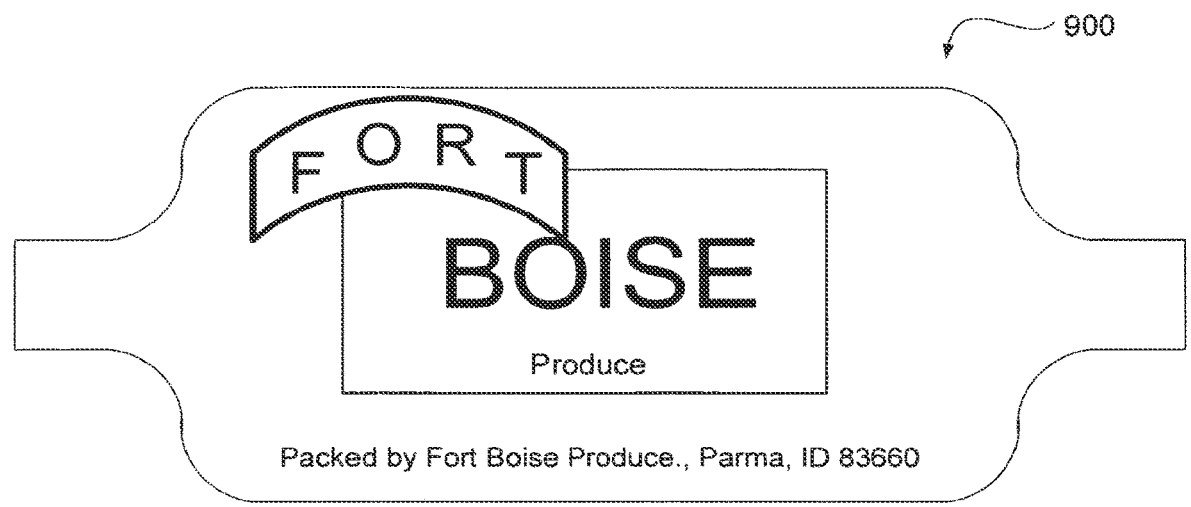
FIGS. 9A and 9B illustrate both sides of an exemplary packing label including a lot ID, according to one exemplary embodiment.

As shown in FIG. 9A, the front of the tag (900) may include source-indicating information including, but in no way limited to information related to the packing facility or broker sourcing the product.

Figure 9B:
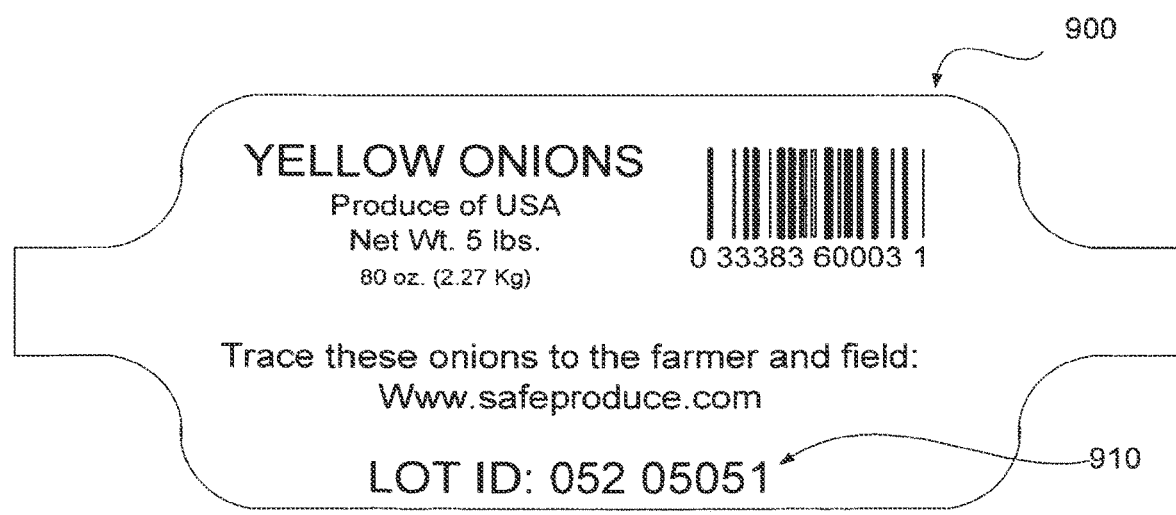

As shown in FIG. 9B, the back side of the exemplary tag (900) may include further product identifying information including, but in no way limited to, product type, weight, and a system barcode. Additionally, as illustrated, the exemplary tag (900) may include a lot identification component (910). Moreover, as shown in FIG. 9B, an HTML address or other identifier indicating where the customer portal configured to receive the lot identification component can be found may be disposed on the exemplary tag (900). While the exemplary tag (900) illustrated in FIGS. 9A and 9B illustrates the lot identification component on the backside of the tag, the exemplary lot identification component may be on any surface.

According to one exemplary embodiment, when the lot identification component (910) is entered into a customer portal, information related to the products assigned the lot identification component is displayed. Examples of manners in which information may be displayed will be described in greater detail below.

Figure 10:
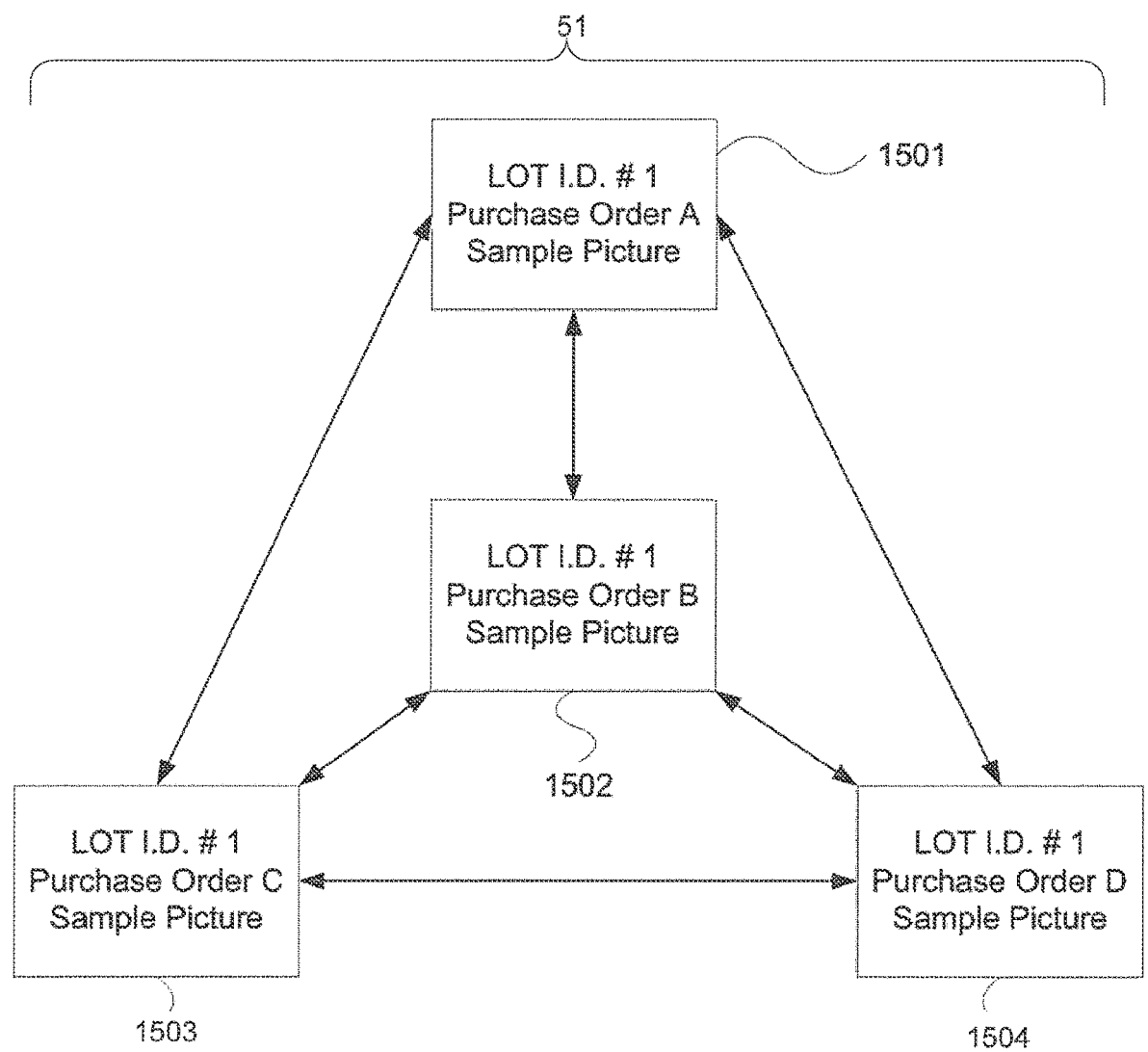
FIG. 10 is a block diagram illustrating a relationship allocation of a lot of produce corresponding to a single lot ID within a server, according to one exemplary embodiment.

Additionally, according to one exemplary embodiment, all of the purchase orders associated with a lot identification component (910; FIG. 9B) may be linked within the server (51). FIG. 10 illustrates the data structure of the server (51) memory modules, according to one exemplary embodiment. As illustrated, multiple purchase orders (1501, 1502, 1503, and 1504) may originate from a single lot, and consequently have the same lot identification component. However, the various purchase orders may be shipped to different locations such as food service locations (15; FIG. 1), retailers (14; FIG. 1), and/or consumers (13; FIG. 1). According to the present exemplary system and method, the various purchase orders stemming from a single lot are linked together within the server (51).

According to the present exemplary embodiment, linking the associated purchase orders stemming from a single lot allows for the rapid identification of all of the orders that are transported from a single lot. In a package containing multiple products, a single lot ID of the package may be linked to all of the products within. For example, if a problem is identified from a single purchase order, such as reports of botulism, e-coli, rot, or other difficulties, the purchase orders associated with the entire lot may then be identified and inspected or re-called as the situation merits. If a spinach in a salad is determined to be contaminated it would be possible to identify all of the locations the spinach was distributed, including packages such as a salad that may contain additional produce other than salad.

For example, according to one exemplary embodiment, a user may enter the USGA code to identify a single order. Once entered, all of the orders related to the entered USGA code will be identified. As illustrated in FIG. 10, each data module representing the individual orders will, according to one exemplary embodiment, include a lot identification component, a purchase order identifier, and a sample media link. According to one exemplary embodiment, the sample media link may include a photograph, audio recording, video presentation, or other multi-media presentation of the grower, facility, and/or inspection. For example, according to one exemplary embodiment, the multi-media presentation may include a video of the grower discussing how a field was planted or cared for, the history of the farm, and/or a discussion of the inspection process and results. These videos may be hosted by the server, or hosted by a third party video hosting service such as YouTube.

Figure 11:
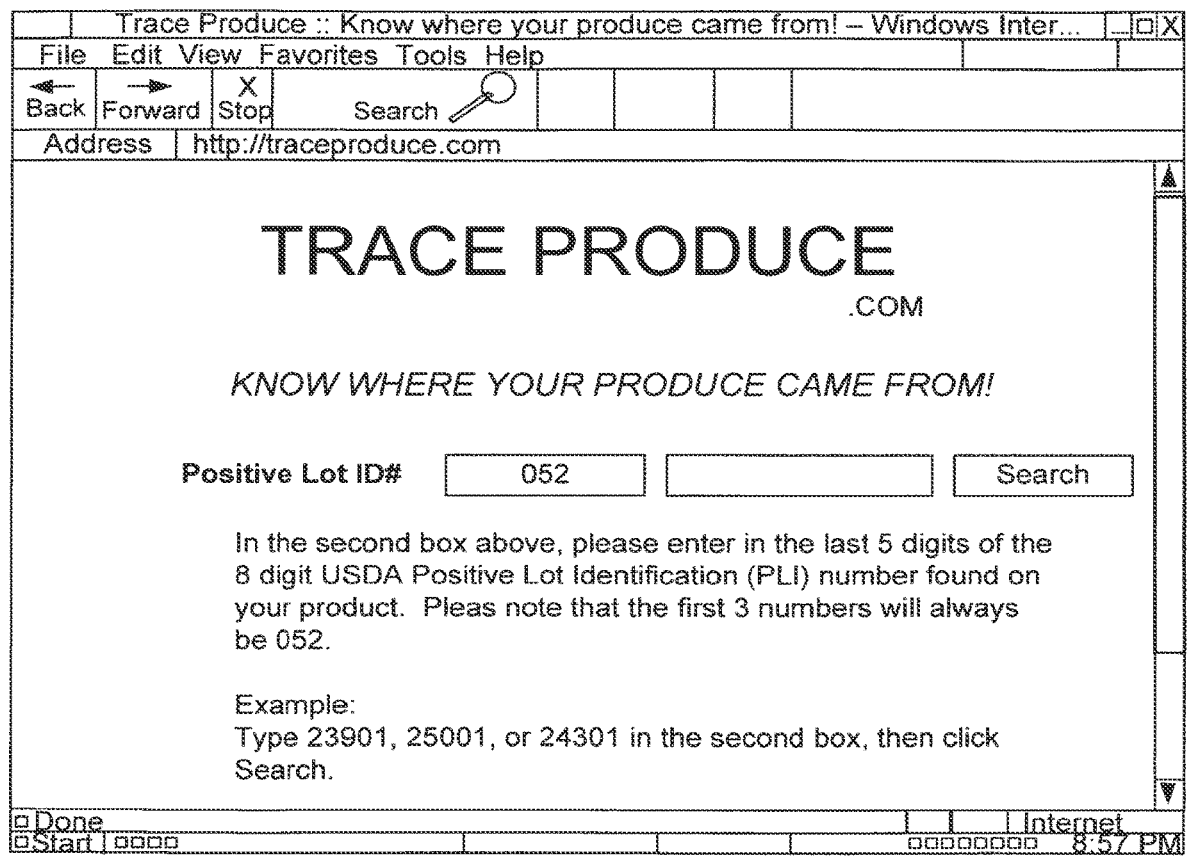
FIG. 11 is a screen shot illustrating an exemplary web page through which a consumer may access information regarding a purchased product by entering the lot ID provided on a product, according to one exemplary embodiment.

As discussed previously the ID tag associated with a lot of produce may contain a URL. A consumer may enter the URL in a web browser and encounter a web portal allowing a consumer to view information relevant to the purchased produce. FIG. 11 shows one exemplary embodiment of a web portal allowing a consumer to enter a lot ID and retrieve information regarding the entered lot ID. It should be understood that this and other screen captures of exemplary user interfaces are intended as examples and do not in any way limit the web portal interface.

Figure 12:
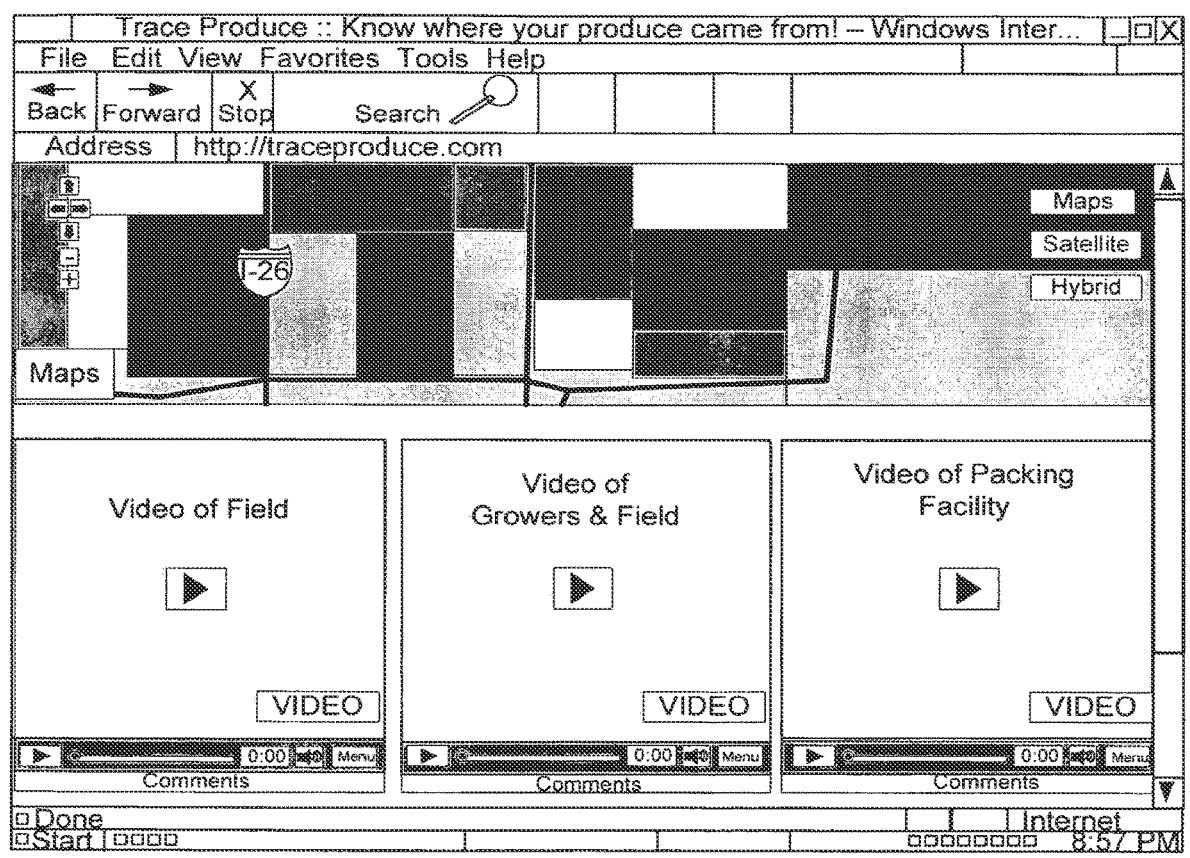
FIG. 12 is a screen shot of a web page a consumer may access showing a link to a Google Map as well as links to YouTube videos that are related a lot ID entered by a consumer, according to one exemplary embodiment.

As illustrated in FIG. 12, after the lot trace code or other lot identification component is entered into a customer portal (FIG. 11), a Trace Write Up Information Page may be displayed to the customer. As illustrate in FIG. 12, according to one exemplary embodiment, the trace write-up information displayed after entering the lot identification component (910) may include, but is in no way limited to, detailed information about the source field of the produce, the source grower of the associated produce, and the packing facility of the associated produce.

Additionally, as illustrated in FIG. 12, the displayed page may contain videos, photos, advertisements, and/or maps hosted by a third part, in the figure YouTube and Google Maps are shown. This may include videos that show and discuss what crops, infrastructure or other items surround the field (example: this would prove that an onion field is not next to a cattle ranch for food safety purposes). Another example would be a video that shows the water distribution system or water source to the field/farm. Another example would be an aerial video taken from a remote control airplane or real airplane the shows the field/farm, water source (River, Canals, Reservoir). Any video related to the field, farmer, grower, shipper, or other member of the supply chain that may be applicable could be linked in some manner to the web page.

Additionally, a button may be present on the interface that allows a customer to view a sample of the produce associated with the lot identification component (910; FIG. 9B). Specifically, as mentioned previously, the photographs associated with the inspection programs can be assigned to the lot identification component (910) such that when the view sample button is selected, the photograph from the inspection programs associated with the lot is displayed. Links or buttons may also be located on the page directing a consumer to advertisements, recipes, and other relevant third party sites. These same advertisements and recipes in any multimedia format may also be included on the web page allowing a consumer to immediately view them upon entering a lot ID number.

In some examples, the produce is additionally or alternatively inspected at a receiving point (e.g., at the broker's place of business or at the retailer's place of business). For example, the federal government has recently established the Fresh Electronic Inspection Reporting/Resource System (FEIRS), which includes an electronic means of recording the inspection summaries prepared by the receiving point inspectors. In some examples, the results of these receiving point inspections are linked to the tracking ID of the produce. In this manner customers may also access the receiving point inspection results.

In addition to the page as illustrated in FIG. 12 various other text, images, videos, or audio related to the lot ID entered on the web portal page (FIG. 11) may be located on the Trace Write Up page or links to the same may be found there. Thus advertisements may be centered strategically around the produce previously ordered by the consumer.

Figure 13:
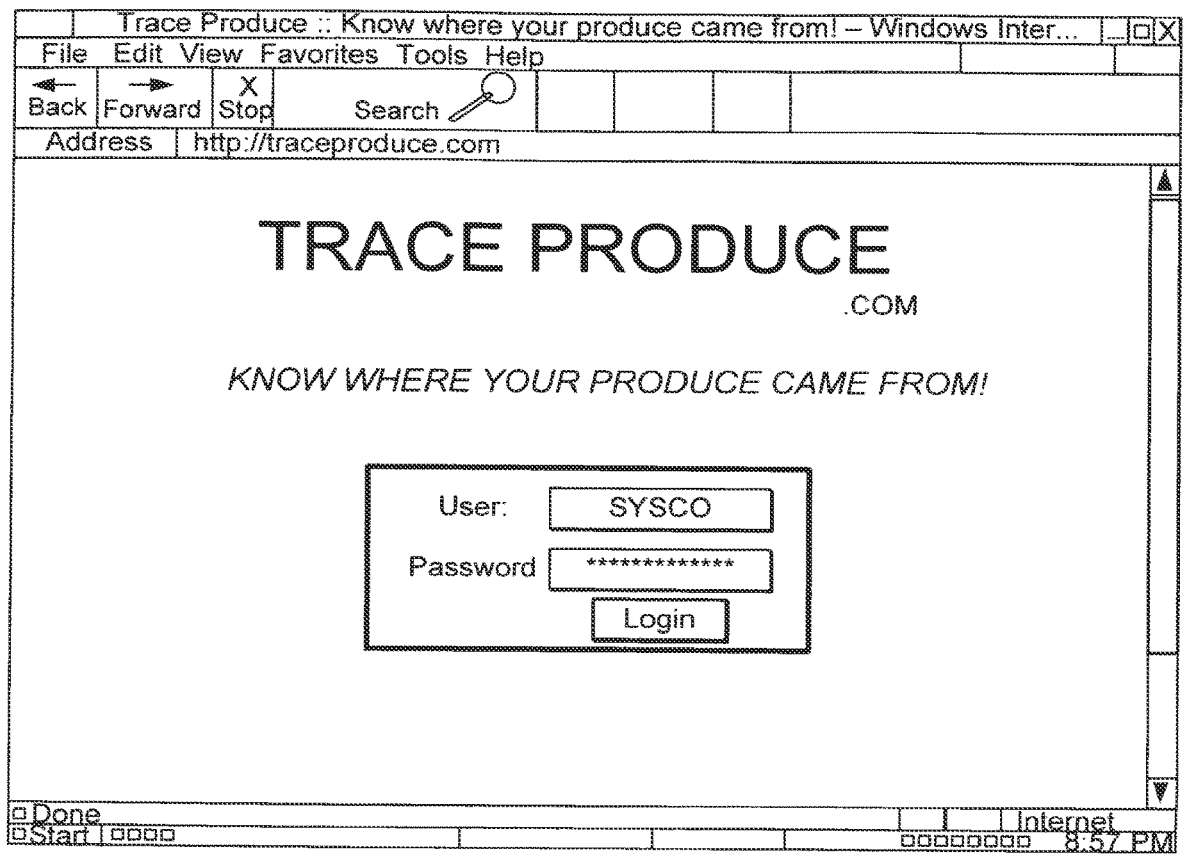
FIG. 13 is a screen shot of a web page a supplier may use to login securely and perform a trace-back on lot of produce, according to principles described herein.

The web portal shown in FIG. 11 shows a site navigation bar near the top in which several links are located, namely: MAIN, CUSTOMER LOGIN, COMMENTS WELCOME, and CONTACT US. A supplier may have been previously provided with a user name and a password allowing the supplier to click on CUSTOMER LOGIN and subsequently login and have access to a more detailed report related to a lot ID. A web page allowing a supplier to login is shown in FIG. 13. In FIG. 13 a field for entering a user name and a field for entering a password are provided. A given user may have different privileges than another, preventing one supplier to view specific information relative to another supplier.

Figure 14:
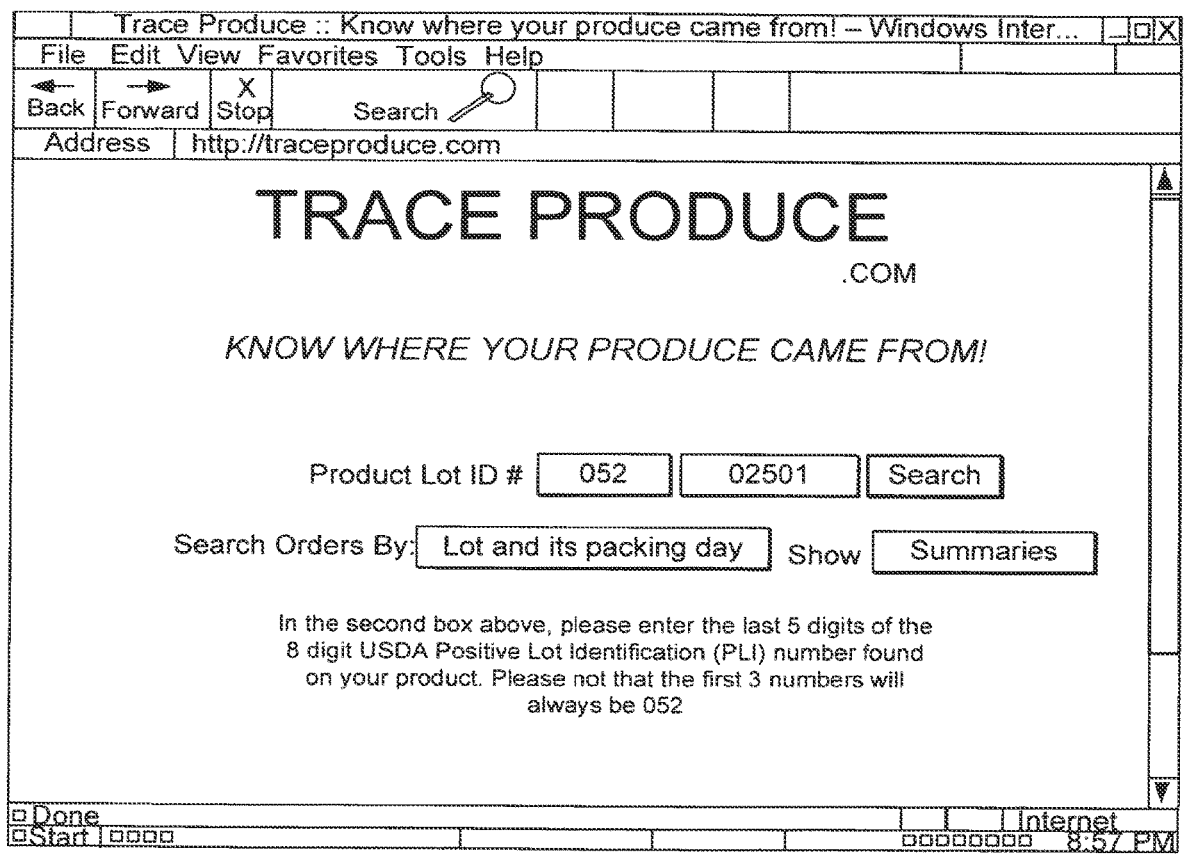
FIG. 14 is a screen shot of a web page a supplier that is logged in may use navigate and view various details related to an entered lot ID, according to one exemplary embodiment.

FIG. 14 is a screen shot, according to one exemplary embodiment, showing a web page allowing a logged in supplier to choose the lot and which details related to the chosen lot the logged in supplier wishes to view. A pull down menu allows a user to select between "lot and its packing day", "lot", "shipper", or "grower", these options may be added to or some may not be available. Also, the logged in supplier may choose to view the details or a summary.

Figure 15:
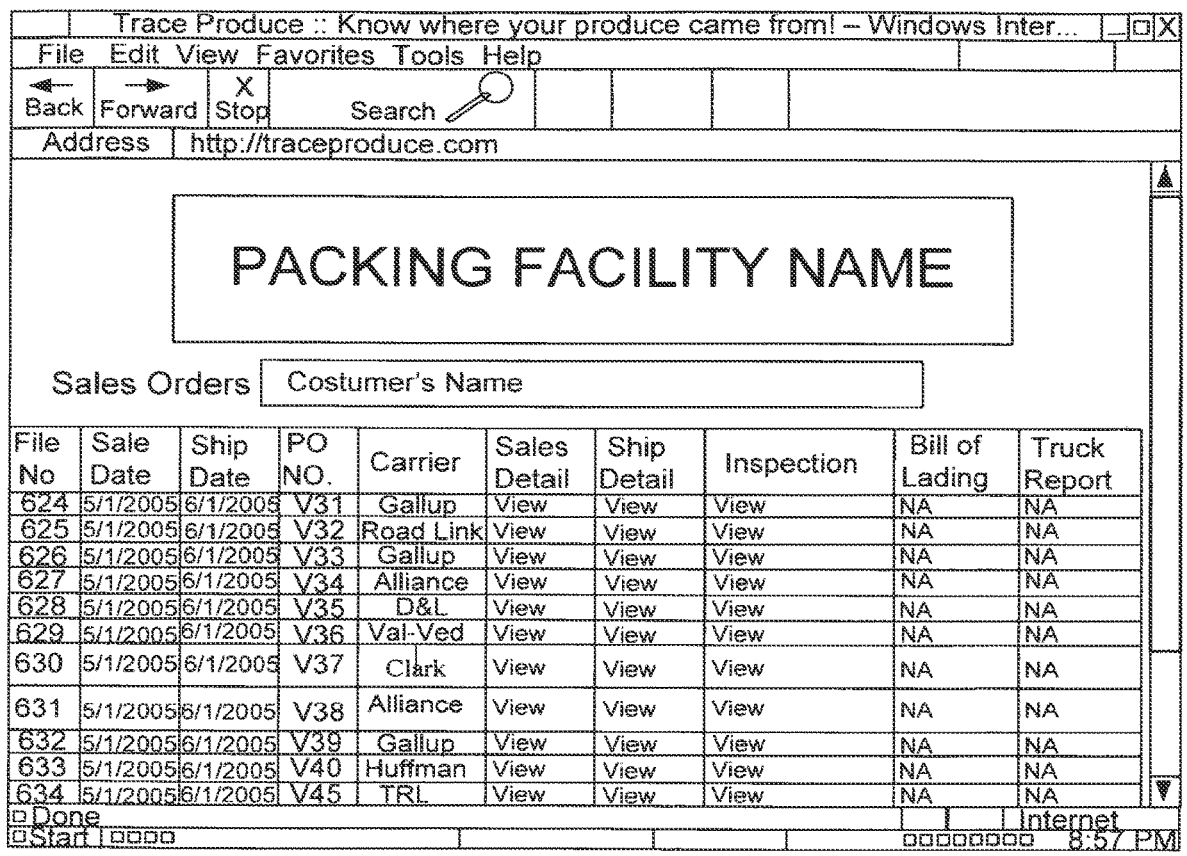
FIG. 15 is a screen shot of a web page showing sales orders, according to one exemplary embodiment.

Upon selecting what is to be viewed relative to a chosen lot of produce, information in the form of web pages and downloadable portable document format (PDF) files may be available, including multimedia formats. According to one exemplary embodiment, the supplier may view a Sales Order page as shown in FIG. 15. Columns of information are given showing details of sales that have been made relative to a lot number. Each sales order includes a file number (a number assigned to the order by the central database), a sales date, a ship date, a purchase order (PO) number, the name of the transport carrier, a link to view the order's sales details, a link to view the order's shipping details, a link to view the inspection report summary corresponding to the order, a link to view the Bill of Lading corresponding to the order, and a link to view a report of the transport vehicle (e.g., a truck). In some examples, the customer may sort the information shown in the sales orders web page by file number, sale date, ship date, or PO number.

Figure 16:
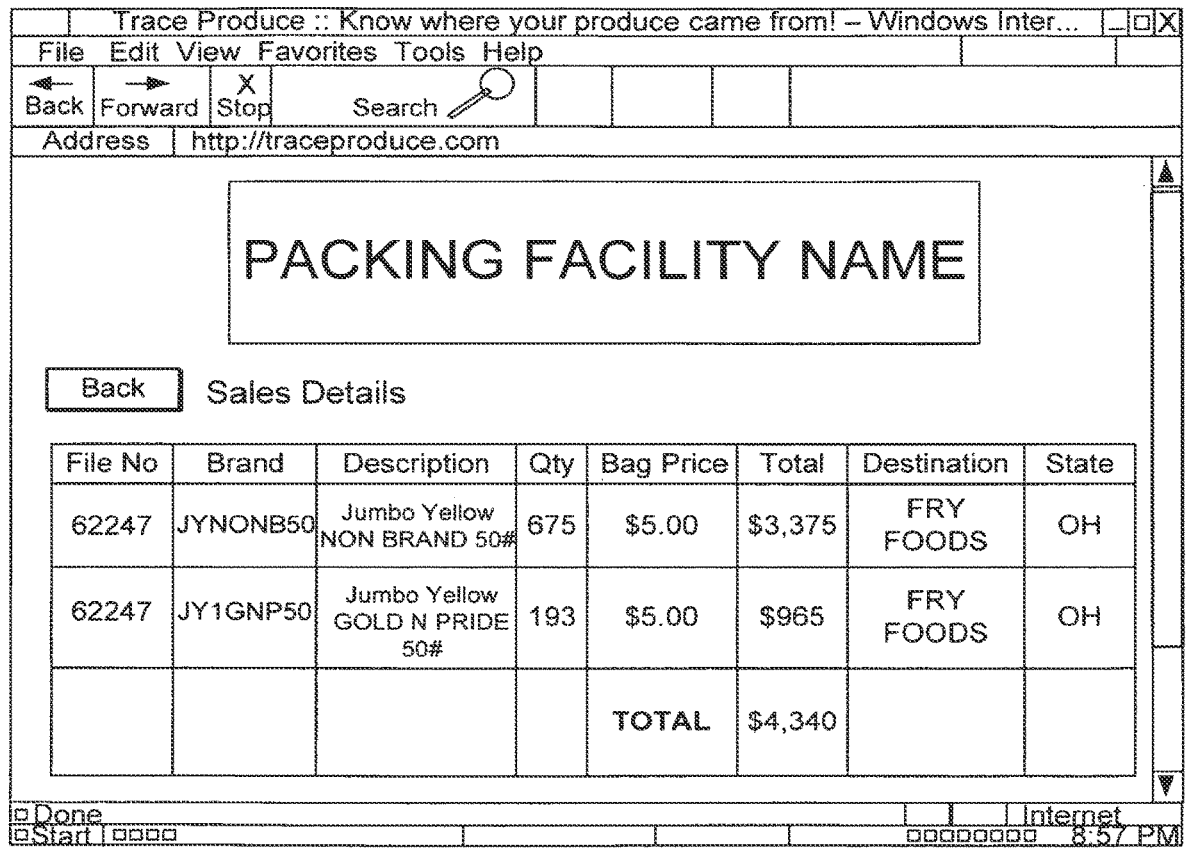
FIG. 16 is a screen shot of a web page showing sales details of a specific sales order, according to one exemplary embodiment.

According to one embodiment, a more detailed search may be performed on a lot of produce allowing a supplier or other authorized person to view details of sales that have been made. An exemplary webpage screen shot is shown in FIG. 16. For example, the customer may desire to view the inspection report summary corresponding to the order having the file number of 62247. To do so, the customer selects the "View" link under the "Inspection" heading corresponding to the file number 62247. Upon selecting the "View" link, a detailed inspection report summary may appear on the screen.

Figure 17:
FIG. 17 is a screen shot of a web page showing shipping details of a lot of produce, according to one exemplary embodiment.

According to one exemplary embodiment, a supplier or other authorized person may also view shipping details, these shipping details may include a variety of information including but not limited to, date, lot ID, description, USDA PLI Trace number, quantity, destination, and various links or buttons allowing navigation to other parts of the web page. An example screen shot according to one embodiment is shown in FIG. 17. Advertisements, photos, videos, certificates, audits, and videos or text describing processes the produce underwent, may also be available; such presentations may be directed toward a supplying company or towards individual consumers.

Figure 18:
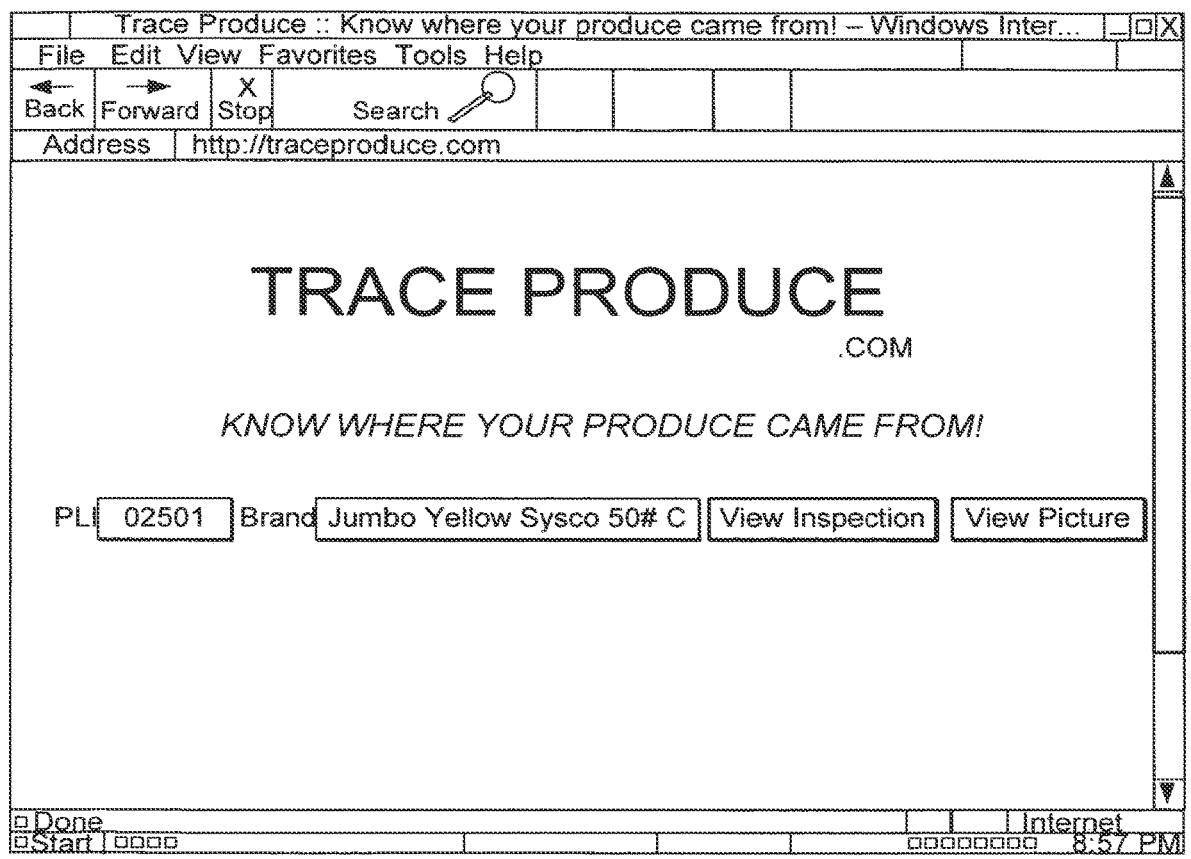
FIG. 18 is a screen shot of a web page after selecting "inspections" within the secure login, allowing a distributor to view inspection details relative to a lot of produce, according to one exemplary embodiment.
Figure 19:
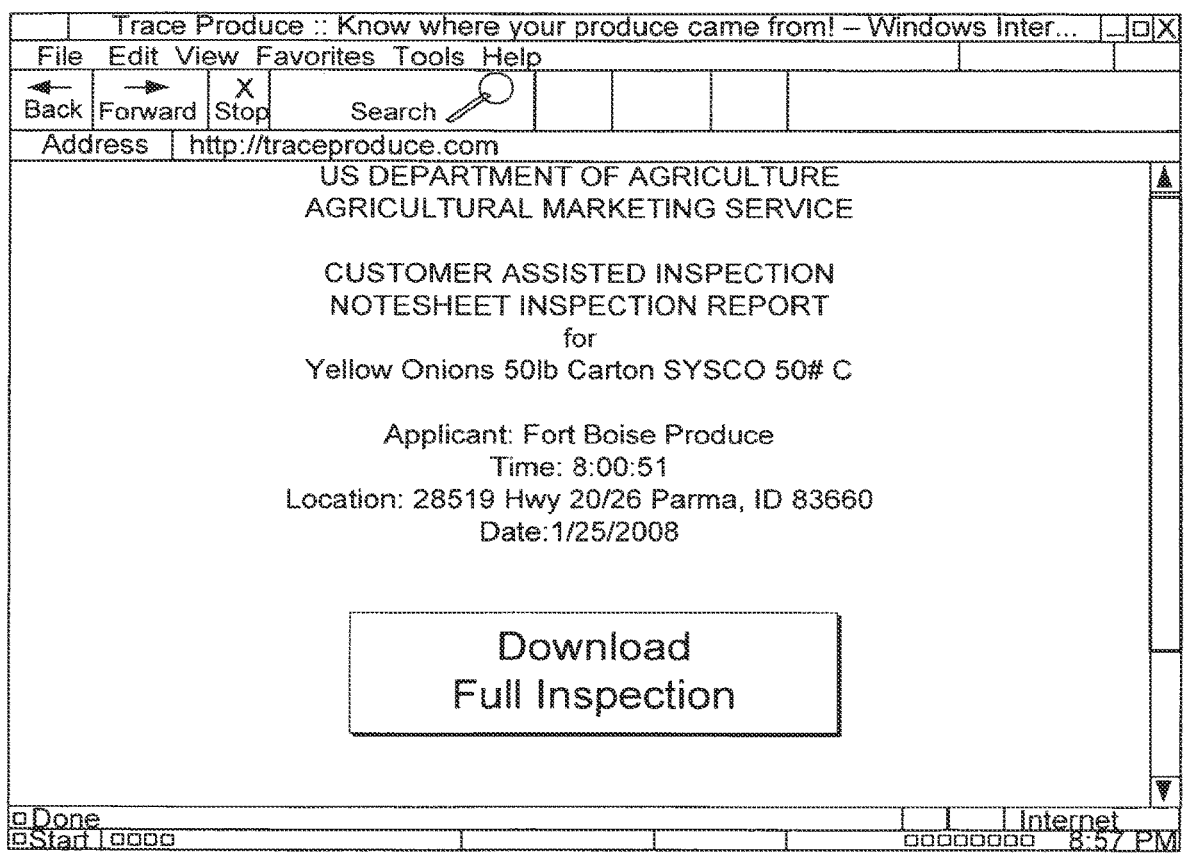
FIG. 19 is a screen shot of a web page after selecting "view inspection" showing the detailed inspection report related to the lot of produce selected, according to one exemplary embodiment.

Once logged in the supplier or other authorized person may navigate via a navigation bar near the top of the page; the navigation bar may contain, but is not limited to links to MAIN, INSPECTIONS, COMMENTS, CONTACT US, and/or other useful links. By selecting INSPECTIONS a user is directed to a webpage allowing the user to select the inspection reports desired for viewing. An exemplary screen shot according to one embodiment is shown in FIG. 18. In this screen shot a supplier chooses a PLI number from a list and the brand desired for viewing. By selecting "VIEW INSPECTION", the user is directed to another page, or begins downloading a page shown according to one embodiment in FIG. 19. As shown in FIG. 19, the inspection report summary may include information regarding the inspection of all the different brands or products within the selected order and is derived from the information entered into the database by the inspector at the packing facility. The inspection report summary shown in FIG. 19 corresponds to an order of onions for illustrative purposes only. It will be recognized that the information included within the inspection report summary may vary depending on the contents of the order and the information provided by the inspector.

Figure 20:
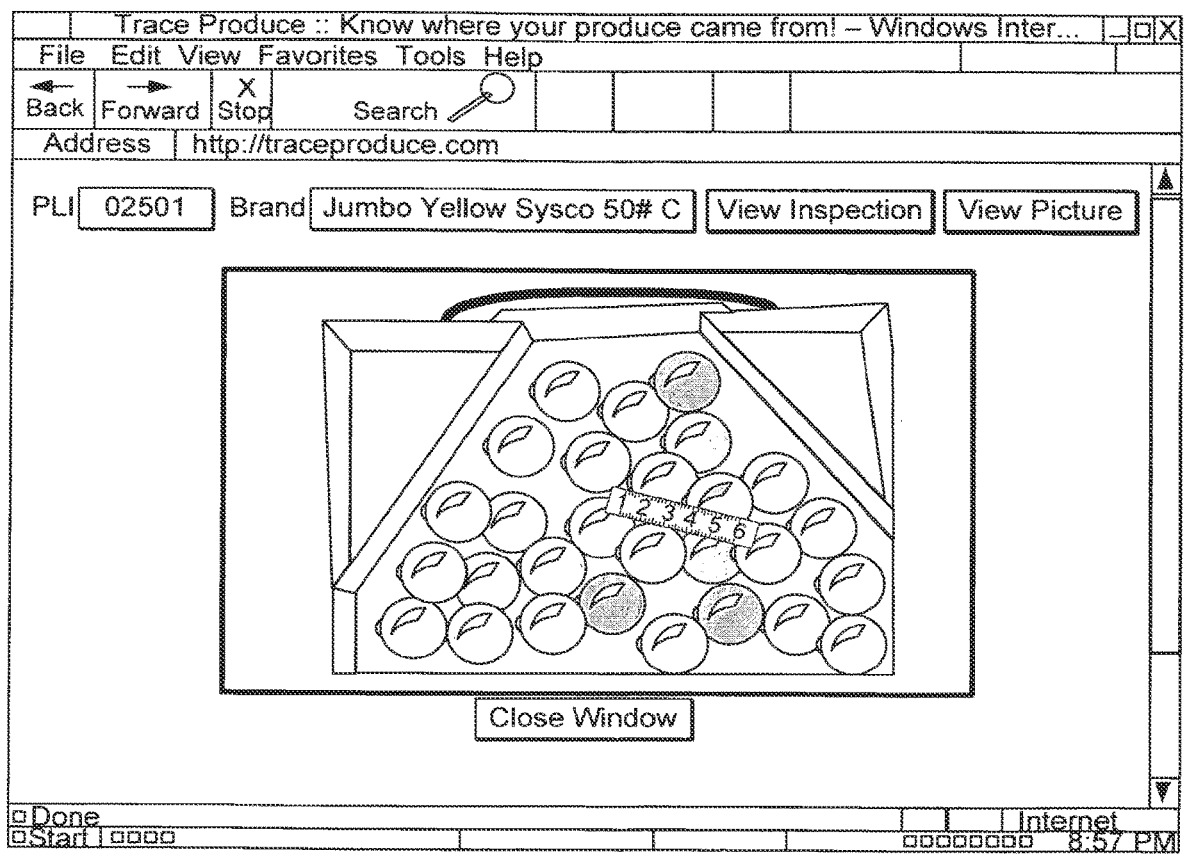
FIG. 20 is a screen shot of a web page after selecting "view picture" showing what the onions looked like during the inspection.

Returning to FIG. 18, a supplier may also choose the button labeled "VIEW PICTURE" a photo or multiple photos of the chosen lot of produce is displayed. According to alternative embodiments the webpage may also included more options for viewing various characteristics of the product. A screen shot of a photo, according to one embodiment, is shown if FIG. 20.

In some examples, the customer may desire to view the details regarding the inspection of a specific sample of produce within the order. Hence, a link (not shown) to the full inspection note sheets that are averaged together to obtain the inspection report summary of FIG. 19 may also be included on the web page shown in FIG. 18. By selecting this link, an image of a full inspection note sheet may appear on the screen. The contents of the full inspection note sheet may vary as best serves a particular type of produce being inspected.

In some examples, some or all of the information shown in any of the web pages of FIGS. 14-20 may be customized, reformatted, and/or omitted for a particular customer. For example, a broker may desire to restrict access to pricing information regarding a particular order for end customers (e.g., retailers). In this example, the sales details web page shown in FIG. 15 or FIG. 16 may be configured to hide pricing information and only show quantity information for each brand of produce within an order when accessed by an end customer.

Hence, the web-based application described in connection with FIGS. 14-20 may be used to quickly access information at any point along the supply chain corresponding to all of the produce that is processed in one or more packing facilities. The information may be sorted and viewed by packing facility, lot ID, tracking ID, USDA PLI number, customer, drop location, broker, field, grower, inspector, inspection results, harvest date, processing date, packing date, shipping date, shipping company, price, quantity, brand, type of produce, or by any other category as desired.

Moreover, the web-based application described in connection with FIGS. 11-20 may be used to standardize the various tracing methods used by different packing facilities. In other words, all the information is input into the central database or databases of individual packing facilities in the same manner in each packing facility. In this manner, every entity throughout the supply chain may be able to access the same information regarding specific orders of produce, specific packing facilities, specific growing fields, etc.

In some examples, the web-based application described herein may also be used by a government inspector to ensure that proper procedures are followed by on-site inspectors. The government inspector may be a state or federal inspector. The government inspector may access and sort inspection summaries by packing facility, customer, order number, on-site inspector name, product, brand, date, etc. The web-based application saves the government inspector considerable time and resources by allowing him or her to access the information via the Internet.

For example, a government inspector may desire to access information regarding inspections of specific samples of produce within a lot of produce that is processed at a particular packing facility. If all the packing facilities use the present systems and methods to input processing and inspection information into the central database, the government inspector may use the web-based application to quickly access the desired inspection information, regardless of the packing facility where the produce was processed.

The web-based application described herein may also be used by a government agent to trace a product back to its corresponding packing facility and/or field where it was grown. For example, if a certain product in a particular grocery store is found to be contaminated, a government agent or onsite inspector may quickly determine where the product was grown and where it was processed prior to shipping by using the tracking number (e.g., the USDA PLI number) to query the web-based application to display tracing information corresponding to the product. If it is determined that the contamination occurred at the packing facility, for example, the government agent may then use the web-based application to quickly determine the location of all other produce processed at that packing facility so that the produce may also be tested, quarantined, or otherwise dealt with. In this manner, acts of bioterrorism, contamination, or any other problem associated with produce may be quickly remedied.

According to one exemplary embodiment described herein, the present exemplary system and method may be used to allow a customer to enter a trace code on a website and pull up all information regarding the grower, field, and packer of the product; or in the case of a lot ID associated with a number of products packaged together, the information corresponding to all of the products within the package.

Additionally, according to one exemplary alternative embodiment, the act of entering the HTML address or other identifier found on the exemplary tag (900) illustrated in FIG. 9B initiates a directed marketing campaign related to the associated produce. According to one exemplary embodiment, the server (51, FIG. 7 or 80, FIG. 8) identifies the general geographic location of the end customer (18; FIG. 7 or 80, FIG. 8) via any number of information gathering techniques including, but in no way limited to, requesting general geographical information via a survey or by using the end customer's IP address and the Internet Service Provider information associated with the remote terminal (52-4). According to this exemplary embodiment, once the server (51, FIG. 7 or 80, FIG. 8) or other remote computing device receives and general geographic location of the end customer (18; FIG. 7 or FIG. 8), a geographically based targeted advertisement campaign, related to the tracked produce may be launched. According to one exemplary embodiment, the server (51; FIG. 7 or 80, FIG. 8) identifies the geographic location of the end customer (18; FIG. 7 or FIG. 8) and identifies what produce is associated with the tracking ID entered. Once the geographic location and the produce are identified, a targeted advertisement campaign can generate advertisements for restaurants in the general geographic area of the end customer (18; FIG. 7 or FIG. 8) that use the same produce. Alternatively, an advertisement may be presented to the end customer related to recipes for sale that may be made with the identified produce or related objects that the end customer (18; FIG. 7 or FIG. 8) may have particular interest in. The advertisement campaigns may be placed directly on the Trace Produce website or alternatively may be links to third party sites. Linking videos hosted by third party video hosting service, such as YouTube, may also be used for advertising purposes.

According to one alternative embodiment, produce or other commodities are labeled with a tracking number. Through this tracking number a user may be directed towards advertising campaigns related to the purchased commodity. A Trace Produce website may not be available; however, a consumer may simply be directed to an advertisement campaign. This campaign may include any known method of advertising, for example video advertisements through sites such as YouTube.

According to one alternative embodiment, produce may be assigned a tracking number and consumers, suppliers, or other persons may enter the tracking numbers in a website and retrieve inspection reports related to the produce tracking number assigned. According to one embodiment, the website may not contain other information as described above such as sales, shipping, and other details, but it would contain some or all pertinent inspection documents. Thus, inspection details or part of inspection details would be accessible to authorized users allowing them to quickly and conveniently view inspection documents. In this embodiment a web server application is used to allow the posting and viewing of inspection documents and possibly photos or videos of the inspection process.

It will be recognized that the web-based application described herein may additionally or alternatively be used to access any other type of information corresponding to produce that is processed in one or more packing facilities. For example, a grower may use the web-based application to access pack out and/or inventory information regarding produce that he or she grows or otherwise produces. Such pack out and/or inventory information may include, but is not limited to, bin reports, pack out reports, lot reports, and truck reports. These reports may allow the grower to view how his or her produce is being inspected, processed, and shipped. They may also allow the grower to calculate an expected return on investment due to the packing performance of his or her produce. Web pages may be designed that allow access to such information as best serves a particular application.

Online Account Based Commodity Tracing System

The preceding information is useful in describing both a system utilizing a central server or various servers containing a database or databases which allow a particular item of produce to be traced; that is all the information relevant to a particular commodity is stored within a database, and each member of the supply chain has limited or unlimited access to the information regarding the commodity. In an alternative embodiment illustrated in FIG. 21 a central website, for example traceproduce.com, allows each member of the supply chain to have an account. The account allows a given member of the supply chain to enter information and view information related to a commodity lot on a limited basis.

Each account is associated with a member of the supply chain of one or more commodities. Within the account, other members may be able to view contact information of that member, such as name, address, fax, telephone, personal websites, email address, and other information that may facilitate in contacting the entity associated with a given account. This may be useful during a recall or during a contamination warning, as through the account system any party having anything to do with a problematic commodity can be notified with ease.

Figure 21:
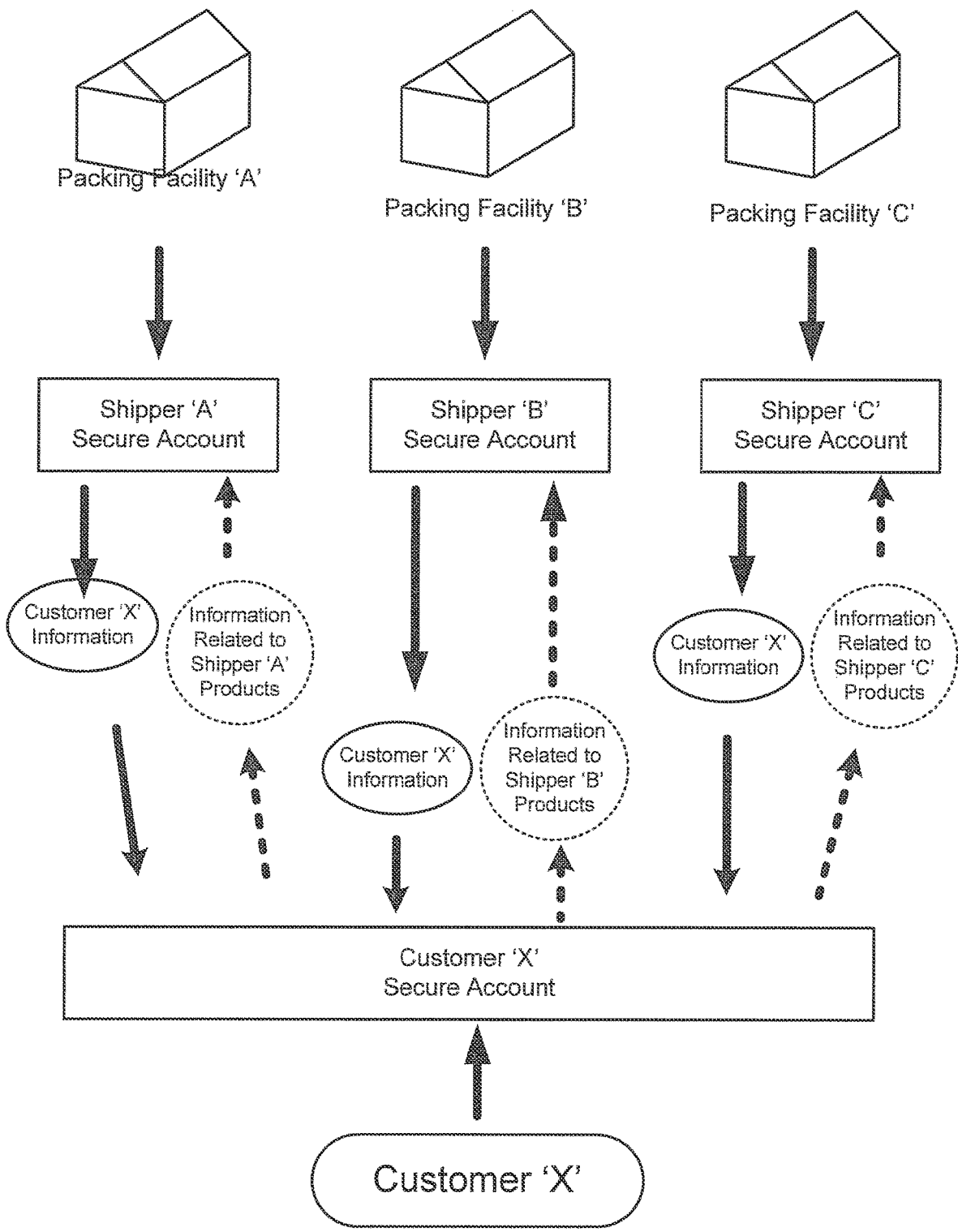
FIG. 21 shows a flow chart illustrating a customer account embodiment allowing members of the supply chain limited access to information belonging to other members of the supply chain, according to one exemplary embodiment.

Illustrated in FIG. 21, three shippers are shown, shipper 'A', shipper 'B', and shipper 'C'. Each shipper receives goods from the packing facility above, packing facilities 'A', 'B', and 'C'. Shippers 'A', 'B', and 'C' each have an account on the website traceproduce.com. A given shipper may enter information relevant to a commodity lot as described above in conjunction with trace system and methods described above not involving accounts, including but not limited to, a lot record including a lot number or PLI number, links to maps, videos, pictures, text, audio, other multimedia presentation, advertisements, audits, pesticide records, certificates, organic certificates, bills of lading, memorandums, and/or any other information deemed relevant to the commodity lot.

By associating a lot ID number to this lot record, an end customer will be able to enter the lot ID number on a purchased commodity and view information as described above in reference to FIGS. 11-20. Just as described above a consumer is able to enter the lot ID and view information regarding the history of the purchased commodity such as, sales, shipping, tracing, inspection, photos, videos, advertisements, and other load information. A shipper may also, by logging into their account, assign order information within a data table for a customer that assigns lot codes, quantities shipped, and destinations for each commodity lot on a specific order. This data file may be accessible to the consumer enabling the consumer to trace which drop locations received products from a given commodity lot as well as quantities and information regarding the commodity lot. A shipper's account may also be used for a shipper to communicate with a customer by sending and receiving messages.

As is illustrated in FIG. 21, a customer has an account with traceproduce as well, the customer account is linked to the shipper account allowing the shipper and the customer to view various information regarding the other. A customer can log into their account page, and from the lot ID on a product container, gain access to the exact shippers account page to view all inspections, data files relative to the customer, and other information a shipper may deem important for the customer regarding the particular commodity lot. Information may include but is not limited to, inspection pictures, audits, information regarding the grower, field, packing facility, and shipment methods. It may also contain photos or audits information regarding any of this information. Information may also be provided in the form of a link to a third party website, this may be particularly useful in the case of audits and certifications where the information is best verifiable by a third part. For example, a link may be present directing a customer to Primus Labs website. All of this information will be allowed in a secure, private page within the shipper's account, where the account is set up specifically for that customer. This allows a shipper with many customers to limit the information each customer has access to. This prevents a given customer from viewing privileged information belonging to another customer.

According to one exemplary system and method, the system and method also allows one member of the supply chain to log into their account and subsequently perform a search. The search may allow the member of the supply chain to locate a shipper, packing facility, grower, broker, inspection agent, certification boards, consumers, vendors, or other member of the supply chain. The search allow one member to find another member offering a commodity or service that they are in need of, or simply a search to find another member of the supply chain that they currently do or would like to do business with.

Just as one member of the supply chain may be prevented from viewing privileged information of another member, one member may allow another member access to a portion or all of their information. This allows any member of the supply chain to have an account, access other accounts as permission is given, communicate with other accounts, and generally be connected to other members of the supply chain for all desired purposes. Members of the supply chain include but are not limited to growers, packing facilities, shippers, customers, brokers, and repackers;

The customer would be allowed, from their account, to upload information regarding the commodity lot to the shipper's account. The shipper account may limit the types and formats of the information allowed to be uploaded. The shipper account may also give different privileges to different customers. Content that a customer may upload includes, but is not limited to, documents, inspections, certifications, pictures of inspected product, other pictures, and any other information deemed relevant to the commodity lot. The information may be uploaded in a secure customer access page within the shipper account that allows for privacy settings. Privacy settings would prevent other customers that do business with the shipper from seeing this information, even though they have access to the shippers account.

Customers and shippers would be allowed to send messages to one another in a secure manner as well. This may be extended allowing the end consumer to send a message, such as feedback, to an interested member of the supply chain. In the preceding description, as noted previously, the term customer refers to any authorized entity that logs into the web-based application and accesses information related to an order of commodity. Exemplary, but not exclusive, customers include, brokers, retailers, individual buyers, inspectors, shippers, growers, regulatory agencies, consumers, and others involved in the supply chain of the commodity. Any member of the supply chain 'A' is able to communicate with another member of the supply chain 'B', if both 'A' and 'B' choose to allow communication from one another. Communication allowed through the account based system and method allows for communication of any form including, but not limited to, text transmission, videos, forms, photos, applications, requests, responses, bids, and any other message one member of the supply chain may choose to send to another member of the supply chain. The host of the web site may choose to limit what can be sent and who is allowed to send what time of material. According to one exemplary embodiment, an inspection video, a video attesting to quality control, or a video of a method used may be sent from one member of the supply chain to another. Additional examples of members of the supply chain communicating with other members of the supply chain include, but are not limited to, a grower communicating with a packing facility, a packing facility with an inspector or shipper, a shipper with a broker, a broker with a consumer, a shipper with a consumer, etc.

Describing in detail the drawing in FIG. 21, three packing facilities A, B and C provide commodities to shippers A, B, and C. Customer X exists as well, the customer may be any person or entity involved in the supply chain such as a broker or a retailer. Shippers A, B, and C have individual accounts on the website, though which they have entered many items of interest regarding many commodity lots, particularly they have each entered information regarding at least one commodity lot that has been purchased, at least in part, by customer X. The information regarding a commodity lot may include the information as described above in reference to FIG. 11-20. Each of the three shippers, A, B, and C, have determined what information relating to the commodity purchased by customer X and have allowed customer X to access such information. This can be seen in the drawing as the arrow extending from each shipper account to corresponding bubbles with solid rings labeled "Customer X information" with an arrow extending from each bubble to the Customer X Secure Account.

Expanding further on the drawing, a dashed arrow extending from the Customer X Secure Account to three dashed bubbles each corresponding to information that the customer X shares with each of the three different shippers. Each bubble may represent different information; that is, the information provided by customer X to shipper A is different than the information provided by customer X to shipper B and shipper C. Information that the customer X may desire to share with each shipper may be information such as documents, photos, further inspection information, and/or other items of interest relating to the commodity purchased from each of the shippers.

It should be understood that FIG. 21, as drawn, shows one customer communicating with three different shippers; this is intended to illustrate one example of the above described ability of one member of the supply chain to communicate with another member of the supply chain, it is not intended to limit the system and method in any way. It is entirely within the scope of this disclosure to include many more members of the supply chain, in which each member has access to another member's information, on a limited basis. It should be understood that in the same way as shown in FIG. 21 where three shippers are shown connected to one customer, that any number of additional accounts might be maintained by various members of the supply chain, all with potential access to one another.

Using an account model is beneficial over the prior described methods involving servers maintained by the members of the supply chain in several ways. In a system involving accounts, where each member of the supply chain creates an account with a website, allows the various members of the supply chain to enter information on their account. Once the information is entered they have access to edit it as well as set security controls enabling other members of the supply chain limited access to view, add to, or edit the information originally entered. Accounts also allow all of the above end consumer benefits as well.

It will be recognized that the systems and methods described as related to the online account based commodity tracing system may be applied to any type of commodity and are not limited to produce only. For example, the systems and methods described herein may be used to keep track of and access information regarding the production, processing, inspection, and/or shipment of any type of produce (e.g., fruits and vegetables), grain, meat, livestock, or other food product; it may be extended to include other fabricated products, where rather than including grower information it may include information pertaining to the fabrication of a certain product. However, for illustrative purposes only, produce is used in the examples described herein.

The members of the supply chain, prior to the end consumer, each have an account allowing them to easily share inspection information as deemed necessary, while the end user notices no difference from the system and method described above in reference to the FIGS. 1-6, and 9-20. That is, the end consumer will still be able to enter a lot ID code found on the purchased commodity and by entering this information into the traceproduce website (FIG. 11) may be presented with information similar to FIG. 12 as discussed in detail above in reference to this drawing. It is of note, that an embodiment involving accounts may add several features to the previously described system and method; however, all of the features and components described in reference to embodiments involving a central server or multiple servers may be incorporated into an embodiment involving accounts. This is not limited to the features and components described in reference to FIGS. 1-20, but an embodiment involving accounts created by members of the supply chain may also include a combination of the two embodiments. It is entirely within the scope of this disclosure to create accounts on a website, such as traceproduce.com, that also allow for a central database to be accessed, or the account based website accesses various servers and databases maintained by the members of the supply chain. In this embodiment, the privileges granted to one account may not be the same as another, one account holder may choose to allow another account holder limited access to their database through the website.

The preceding description has been presented only to illustrate and describe embodiments of the invention. It is not intended to be exhaustive or to limit the invention to any precise form disclosed. Many modifications and variations are possible in light of the above teaching. Modification of the above disclosure may include only pieces of the process as exclusive entities or combinations of pieces to form a useful application in which various described elements of the disclosure are not incorporated. As three specific embodiments of the system and method have been described, namely, a central server, various servers, and an account based version, it is important to recognize that each embodiment may be used alone or in conjunction pieces of the other embodiments. Specifically, the embodiment involving accounts is easily modifiable to incorporate any piece of the other embodiments.

What is claimed is:

1. A product tracing method, comprising:
gathering, by at least one member of a supply chain, information of the product, the information of the product including at least one of inspection information, origin information, packing information, and tracing information;
creating an on-line account where one member of the supply chain assigns the product to an order;
entering the order assignment and the information of the product through the online account into one or more servers;
correlating, on the one or more servers, the gathered information to the product; and
providing a web-based application configured to provide at least a second member of the supply chain with access to view at least one of the gathered product information and order assignment in response to the at least a second member of the supply chain searching for the gathered product information via the web-based application.

2. The product tracing method of claim 1, further comprising storing product information and orders in a database that is communicatively coupled to the at least one server.

3. The product tracing method of claim 1, wherein the one member of the supply chain can give permissioned access to the tracing information to the at least second member of the supply chain by setting security controls that selectively limit the ability of the at least second member of the supply chain to view, or add to, the product information.

4. The product tracing method of claim 3, further comprising configuring the at least one server to allow the members of the supply chain to search the web-based application for all products and orders associated with a common code or product.

5. The product tracing method of claim 4, further comprising assigning a trace code to the product, wherein the trace code can be entered, scanned, searched, or viewed within the web-based application to access the information of the product.

6. The method of claim 5, wherein the trace code comprises a source identifier.

7. The product tracing method of claim 6, further comprising searching, via the on-line account, for the member of the supply chain with the source identifier.

8. The product tracing method of claim 7, wherein searching for the member of the supply chain with the source identifier provides access to an account within the on-line account corresponding to the member of the supply chain.

9. The product tracing method of claim 1, wherein the information of the product on the one or more servers is received from the at least one member of the supply chain and a second member of the supply chain and aggregated on the one or more servers.

10. The product tracing method of claim 1, wherein the product information is uploaded to the one or more servers via the on-line account.

11. The product tracing method of claim 10, wherein a package housing a plurality of products comprises a single product trace code corresponding to historical origin information for each of the plurality of products housed in the package.

12. The product tracing method of claim 10, wherein a package housing a plurality of products comprises a plurality of product trace codes, each product trace code corresponding to historical origin information for a specific product of the plurality of products housed in the package.

13. A method for maintaining product tracing information within a supply chain, comprising:
creating a first account within a web-based application, the first account associated with a first member of the supply chain;
creating a second account within the web-based application, the second account associated with a second member of the supply chain;
gathering, by the first member of the supply chain, product tracing information associated with a product, wherein the product tracing information comprises documents, certificates, or audits related to the product;
linking the product tracing information with the product;
transmitting and storing the tracing information onto at least one server;
assigning, on the at least one server, a trace code associated with the product tracing information to the product;
affixing the trace code to the product;
correlating, on the at least one server, the trace code to the product tracing information;
populating, via the at least one server, the first account with the product tracing information, wherein the product tracing information is updated with information from the at least one server; and
providing, from the at least one server, the web-based application configured to provide the second member of the supply chain with access to the product tracing information via the second account in response to the second member of the supply chain entering the trace code in the web-based application;
wherein entering the trace code by the second member of the supply chain within the web-based application provides permissioned access to the product tracing information populated in the first account.

14. The method of claim 13, wherein the first member of the supply chain grants the permissioned access to the product tracing information to the second member of the supply chain by setting security controls that selectively limit the ability of the second member of the supply chain to view the product tracing information via the second account.

15. The method of claim 14, wherein the trace code comprises a source identifier.

16. The method of claim 15, further comprising searching, via the web-based application, for data associated with the first member of the supply chain with the source identifier.

17. The method of claim 13, wherein affixing the trace code to the product comprises at least one of printing a tag and affixing the tag to the product, stamping the trace code onto the product, or printing the trace code directly onto the product.

18. The method of claim 16, wherein the product comprises a food product; and
wherein the source identifier comprises a packing facility identification.

19. A method for maintaining product tracing information within a supply chain, comprising:
creating, by multiple members of the supply chain, accounts within a web-based application;

gathering, by a first member of the supply chain, tracing information associated with a product, the product comprising at least one of a blended product, a repacked product, or a commingled product;
wherein the tracing information contains inspection information, origin information, or packing information from at least one source location for the product,
linking the at least one source location tracing information with the product;
transmitting and storing the tracing information onto at least one server;
assigning, on the at least one server, the tracing information associated with a lot record or a lot identifier linked with at least one of the accounts to a product trace code assigned to the product;
affixing the trace code associated with the tracing information to the product;
correlating, on the at least one server, the product trace code to the tracing information;
populating, via the at least one server, a web-based application with the tracing information, wherein the tracing information is updated with information from the at least one server; and
providing, from the at least one server, a web-based application configured to provide at least a second member of the supply chain with access to the tracing information on the web page in response to entering, searching, scanning, or viewing the product trace code in the web-based application;
wherein the first member of the supply chain can give permissioned access to the tracing information to the second member of the supply chain by setting security controls that selectively limit the ability of the second member of the supply chain to view, or add to, the product tracing information.

20. The method of claim 19, wherein the at least one source location information comprises multiple lot records linked to the trace code.

21. The method of claim 19, wherein the trace code comprise a source identifier.

22. The method of claim 21, further comprising searching, via the web-based application, for the first member of the supply chain with the source identifier.

23. An online account-based product tracing method for accessing tracing information for a product within orders, comprising:
gathering, by at least one member of a supply chain, product information, the product information including at least one of inspection information, origin information, and packing information of the product;
creating a first online account associated with a first member of the supply chain;
creating a second online account associated with a second member of the supply chain;
affixing a trace code associated with a product identification to the product by a first member of the supply chain;
assigning, by the first member of the supply chain, the trace code to the gathered product information;
assigning, by the first member of the supply chain, the trace code to order information;
entering the order information and the product information through the online account into at least one server;
correlating, on the at least one server, the product information with the order information; and
providing a web-based application via the at least one server through which the second member of the supply chain can access at least one of the product information and the order information in response to the second member of the supply chain entering the trace code into the second account;
wherein the first member of the supply chain selectively grants permission to the second member of the supply chain to access inventory quantities of the product via the web-based application.

24. The product tracing method of claim 23, further comprising:
storing the product information and the order information in a database communicatively coupled to the at least one server; and
linking a purchase order to the trace code within the database.

25. The product tracing method of claim 24, wherein:
the gathering of product information includes gathering lot attributes associated with the product, and linking the lot attributes with the trace code within the database; and
the web-based application allows the second member of the supply chain to search for the product and an order within the database via the lot attribute.

26. The product tracing method of claim 25, wherein inventory quantities for the product and the order associated with the lot attribute includes a product trace code linked to the lot attribute within the database.

27. The product tracing method of claim 24, further comprising:
assigning a single product trace code to a package containing a plurality of products; and
linking, within the database, the single product trace code to historical origin information for each of the plurality of products.

28. The product tracing method of claim 24, wherein the trace code comprises one or more of a lot id, a run number, a date code, a lot number, an RFID code, a barcode, and a tracking id within the database.

29. The product tracing method of claim 24, wherein the trace code is associated in the database with a lot attribute of a packing facility, a farm, a field, a date, or a production run.

30. The product tracing method of claim 24, wherein the product information is shared by multiple products.

31. The product tracing method of claim 23, wherein the first member of the supply chain grants the second member of the supply chain permissioned access to the tracing information by setting security controls that selectively limit the ability of the second member of the supply chain to view or add to at least one of the product information or the order information.

32. The product tracing method of claim 23, wherein entering the trace code by the second member of the supply chain comprises entering the trace code into the web-based application.

33. The method of claim 32, wherein, the trace code is entered through a web portal without access to an online account.

34. The product tracing method of claim 33, wherein:
product information available to an end-consumer via the web portal includes at least one of a photograph, a video, a map, text, a certificate, an inspection document, an origin document, or a packing information document; and
the first member of the supply chain adjusts the product information available to the end-customer.

35. The product tracing method of claim 32, wherein the first member of the supply chain grants permissioned access to the web portal by the end-customer by setting security controls that selectively limit the ability to access the product information or the order information via the web portal.

36. The product tracing method of claim 35, wherein the first member of the supply chain selectively adjusts the product information available to the end-customer through the web portal.

37. The product tracing method of claim 23, wherein the product information on the at least one server is received from both the first member of the supply chain and the second member of the supply chain and aggregated on the at least one server.

38. The product tracing method of claim 23, wherein at least one of product information or order information is uploaded to the one or more servers via the on-line account.

39. The product tracing method of claim 38, further comprising accessing a plurality of databases, by the at least one server, to access information associated with the product and an order.

40. The product tracing method of claim 38, further comprising storing the product information and the order information in a database communicatively coupled to the at least one server.

41. The product tracing method of claim 23, wherein:
the second member of the supply chain grants access to lot identifiers within the second account to the first member of the supply chain; and
the first member of the supply chain links the lot identifiers to a trace code controlled by the first member of the supply chain.

42. The product tracing method of claim 23, wherein affixing a trace code to a product comprises printing on a tag that is affixed to the product, or marking directly onto the product.

43. The product tracing method of claim 23, wherein the inspection information includes at least one of quality information, grade information, weight information, brand information, counts information, color information, inspection product pictures, inspection product videos, and inspection text documents.

44. The product tracing method of claim 23, wherein:
the first member of the supply chain gathers and uploads product information and order information into a database system via the first account; and
the second member of the supply chain gathers and uploads at least one of product information and order information into a database system via the second account.

45. The product tracing method of claim 44, wherein:
the first member of the supply chain controls all data that uploaded via the first account; and
the first member of the supply chain can give permissioned access to at least a portion of the data to a second member of the supply chain within the account based system.

46. The product tracing method of claim 23, wherein the origin information and the packing information includes at least one of pictures, text, descriptions, harvest information, packing details, videos, maps, GPS Coordinates, variety information, seed information, location information, shipment information, certificates, documents, planting information, audits, organic certificates, and transport vehicle information.

47. The product tracing method of claim 46, wherein at least one of the inspection information or the origin information for the product is captured by each member of the supply chain.

48. The product tracing method of claim 23, wherein each member of the supply chain controls their own uploaded data and whom said uploaded data is shared with.

49. The product tracing method of claim 48, wherein the tracing information comprises shared transactional data between the first and second member of the supply chain.

50. The product tracing method of claim 48, wherein access or modification of product information generates a date and time stamp associated with the modification.

51. The product tracing method of claim 23, wherein:
the first member of the supply chain comprises a packing facility;
the second member of the supply is granted access to the product and order data information associated with the packing facility and the trace code by the first member of the supply chain in response to the second member of the supply chain entering the trace code in the second online account; and
the trace code comprises a tracking identifier that traces the product to data associated with the packing facility.

52. The product tracing method of claim 51, wherein the tracking identifier is associated with the packing facility.

53. The product tracing method of claim 52, wherein the first member of the supply chain provides access to a regulatory agency.

54. The product tracing method of claim 52, wherein the second member of the supply chain accesses purchase orders associated with the second member of the supply chain, purchase orders associated with the first member of the supply chain member, and orders associated with the trace code.

55. The product tracing method of claim 54, wherein the second member of the supply chain can enter a lot attribute, a lot, or a trace code on the web-based application to search for orders and inventories associated with the lot attribute, the lot, or the trace code.

56. The product tracing method of claim 55, wherein each member of the supply chain controls their own data uploaded to the web-based application and access to the data by other members of the supply chain.

57. The product tracing method of claim 23, wherein data is uploaded to the first online account from an internal data system of the first supply chain member.

58. The product tracing method of claim 23, wherein the product data is entered onto the at least one server from multiple packing facilities via the web-based application.

59. The product tracing method of claim 58, wherein the product data comprises data uploaded to the at least one server by the first member of the supply chain and the second member of the supply chain via the web-based application.

60. The product tracing method of claim 23, wherein the product information comprises product movement destinations.

61. The product tracing method of claim 23, wherein the second member of the supply chain selectively grants permission to the first member of the supply chain to access inventory quantities of the product via the web-based application.

62. A system for tracing a product, the system comprising:
at least one server connected to a database, the database including instructions that, when executed by the server, cause the server to:

store information of the product on the database, the information of the product including at least one of inspection information, origin information, packing information, and tracing information;

create an on-line account where one member of the supply chain assigns the product to an order;

correlate the order assignment and the information of the product to the product on the database; and provide a web-based application configured to allow the one member of the supply chain to give permissioned access to at least a second member of the supply chain to view at least one of the gathered product information and order assignment in response to the at least a second member of the supply chain searching for the gathered product information via the web-based application.

63. The system for tracing a product of claim 62, wherein the server further allows the one member of the supply chain to give permissioned access to the tracing information to the at least second member of the supply chain by setting security controls that selectively limit the ability of the at least second member of the supply chain to view, or add to, the product information.

64. The system for tracing a product of claim 63, wherein the server generates a date and time stamp in response to a modification of product information on the database.

65. The system for tracing a product of claim 64, wherein the product information comprises inspection information.

66. The system for tracing a product of claim 62, wherein, a trace code is assigned to the product information on the database by the one member of the supply chain.

67. The system for tracing a product of claim 66, wherein:
the trace code is entered through a public web portal without access to an online account:
product information available to an end-customer via the web portal includes at least one of a photograph, a video, a map, text, a certificate, an inspection document, an origin document, and a packing information document; and
the one member of the supply chain adjusts the product information available to the end-customer via the web-based application.

68. The system for tracing a product of claim 62, wherein the server provides the second member of the supply chain with information of the product via the web-based application in response to the second member of the supply chain entering the code in the web-based application.

69. The system for tracing a product of claim 68, wherein the entering the code in the web-based application comprises entering or scanning a code on the product.

* * * * *